United States Patent [19]
Okamura et al.

[11] Patent Number: 6,104,530
[45] Date of Patent: *Aug. 15, 2000

[54] TRANSPARENT LAMINATES AND OPTICAL FILTERS FOR DISPLAYS USING SAME

[75] Inventors: Tomoyuki Okamura; Fumiharu Yamazaki; Shin Fukuda; Ryu Oi, all of Kanagawa-ken; Masaaki Yoshikai; Masato Koyama, both of Aichi-ken, all of Japan

[73] Assignee: Mitsui Chemicals, Inc., Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/863,562

[22] Filed: May 27, 1997

[30] Foreign Application Priority Data

| May 28, 1996 | [JP] | Japan | 8-133982 |
| Oct. 22, 1996 | [JP] | Japan | 8-279503 |
| Dec. 3, 1996 | [JP] | Japan | 8-322854 |

[51] Int. Cl.$^7$ .............. F21V 9/04; G02B 8/08; G02B 1/10; B32B 15/04
[52] U.S. Cl. ............ 359/359; 359/360; 359/350; 359/585; 359/588; 359/589; 428/336
[58] Field of Search .................. 359/359, 360, 359/585, 588, 589; 428/469, 472; 427/162, 164

[56] References Cited

U.S. PATENT DOCUMENTS

| 4,179,181 | 12/1979 | Chang | 359/360 |
| 4,352,006 | 9/1982 | Zega | 359/360 |
| 4,590,118 | 5/1986 | Yatabe et al. | |
| 4,859,532 | 8/1989 | Oyama et al. | |
| 4,931,782 | 6/1990 | Jackson | 345/774 |
| 4,996,105 | 2/1991 | Oyama et al. | 428/336 |
| 5,124,067 | 6/1992 | Itoh et al. | |

FOREIGN PATENT DOCUMENTS

| 0464789 | 1/1992 | European Pat. Off. |
| 2717171 | 9/1995 | European Pat. Off. |
| 8-32436 | 3/1996 | Japan |

OTHER PUBLICATIONS

Tsutae Shinoda, "Color Plasma Display Panel Moves Toward Practical Realization", *2209 JEE Journal of Electronic Engineering*, 27 (1990) Supp. No. 1, Tokyo Japan, pp. 33–35.

*Primary Examiner*—Audrey Chang
*Attorney, Agent, or Firm*—Burns, Doane, Swecker, & Mathis, L.L.P.

[57] ABSTRACT

Transparent laminates which have high transparency and, moreover, excellent electromagnetic shielding characteristics and near-infrared cutting-off characteristics, and optical filters for displays using these transparent laminates. These transparent laminates are formed by laminating a transparent electrically conductive layer composed of high-refractive-index transparent film layers (B) and metal film layers (C) consisting of silver or a silver-containing alloy on one major surface of a transparent substrate (A) in such a way that a repeating unit comprising a combination of one high-refractive-index transparent film layer (B) and one metal film layer (C) is laminated three times or more, and further laminating one high-refractive-index transparent film layer (B) thereon. The transparent laminate has a sheet resistance of not greater than 3 $\Omega$/sq., a visible light transmittance of not less than 50%, and a light transmittance of not greater than 20% in a wavelength region longer than 820 nm. Optical filters for displays which serve to block leakage electromagnetic waves and near-infrared light from plasma displays can be acquired by using such a transparent laminate.

25 Claims, 3 Drawing Sheets

TRANSPARENT LAMINATES AND OPTICAL FILTERS FOR DISPLAYS USING SAME

BACKGROUND OF THE INVENTION

1. Field of the Invention

This invention relates to transparent laminates and optical filters for displays using the same. More particularly, it relates to transparent laminates having excellent electromagnetic shielding characteristics and near-infrared blocking characteristics as well as high transparency, and to optical filters for displays which use such transparent laminates and which have excellent electromagnetic shielding characteristics, excellent near-infrared blocking characteristics, high transparency, low reflectance, good weather resistance and good environmental resistance, in combination with antiglare properties and/or anti-Newton ring properties.

2. Description of the Prior Art

With the rapid development of information in society, optoelectronic components and equipment have been markedly advanced and popularized. Among others, displays for presenting pictures have spread wide for use as television receivers and monitors for personal computers, and the like, and they are increasing in size while decreasing in thickness. In recent years, plasma displays have attracted attention because of their suitability for use in applications such as large-sized thin television receivers and monitors, and have begun to come into the market. However, on the basis of their structure and operational principle, plasma displays emit a strong leakage electromagnetic field. In recent years, the influence of a leakage electromagnetic field on the human body and other electronic equipment has come to be discussed, and it has become necessary to keep the leakage electromagnetic field emerging from plasma displays within the limits of established safety standards. Such safety standards include, for examples, the standards set up by VCCI (Voluntary Control Council for Interference by data processing equipment and electronic office machines) in Japan, and the standards set up by FCC (Federal Communication Commission) in U.S.A.

Moreover, plasma displays emit intense near-infrared radiation which may act on electronic equipment such as cordless phones and infrared remote controllers and cause malfunction thereof. The wavelengths which are of particular interest are those used in infrared remote controllers and optical communication by transmission systems, such as 820 nm, 880 nm and 980 nm. Consequently, the light in the near-infrared region of the wavelength region of 800 to 1,000 nm which emerges from plasma displays must be blocked to such a level as to cause no problem from a practical point of view.

As described above, when a plasma display is used, it is necessary to reduce the levels of the electromagnetic waves and near-infrared radiation emitted from the plasma display into the environment. Consequently, it has been investigated to provide the plasma display with an optical filter having electromagnetic shielding characteristics and near-infrared cutting-off characteristics. As a matter of course, this optical filter must be highly transparent to visible light. Moreover, since this optical filter is mounted in front of the display, it is also desirable in some cases that the optical filter has a low visible light reflectance and/or excellent antiglare properties and/or anti-Newton ring properties.

With regard to the blocking of near-infrared radiation, near-infrared absorption filters made by using near-infrared absorbing dyes have been known in the prior art, but they involve various problems. For example, cyanines used as near-infrared absorbing dyes have poor stability to light and are not suitable for practical purposes. Anthraquinones and naphthoquinones have high absorptivity in the visible light region, so that near-infrared absorption filters made by using them suffer from a reduction in visible light transmittance. Phthalocyanine dyes used as near-infrared absorbing dyes have high light resistance and efficiently absorb near-infrared radiation in the wavelength region of 700 to 800 nm. However, some phthalocyanine dyes cannot absorb near-infrared radiation having wavelengths longer than 800 nm which are used in remote controllers and the like and hence responsible for malfunction thereof. Moreover, naphthalocyanine dyes are relatively expensive. Generally, near-infrared absorbing dyes have the disadvantage that they deteriorate under the action of environmental factors such as humidity, heat and light and, therefore, the near-infrared absorption filters using them undergo changes in optical properties (e.g., near-infrared blocking ability and filter color) with the lapse of time.

Since plasma displays emit intense near-infrared radiation over a wide wavelength range, it is necessary to provide them with a near-infrared absorption filter having high absorptivity for near-infrared light in a wide wavelength range. However, in order to reduce the near-infrared transmittance to such an extent as to cause no problem, the amount of dye contained in the filter must be increased. This may cause a reduction in visible light transmittance.

In optical filters for plasma displays, the increase of members resulting from performance requirements such as electromagnetic shielding cause various problems such as an increase in cost, a reduction in visible light transmittance due to the bonding of members, and an increase in the degree of reflection at bonding interfaces. Specifically, an optical filter for plasma displays is mounted in front of a plasma display to block near-infrared radiation and electromagnetic waves emerging from the display, its low visible light transmittance may contribute to a reduction in the definition of the picture. Generally, optical filters for displays should have as high a visible light transmittance as possible. Specifically, they should have a visible light transmittance of not less than 50%, preferably not less than 60%, and more preferably not less than 70%.

In order to block a leakage electromagnetic field (or electromagnetic waves) emerging from a display, the surface of the display must be covered with an object having high electric conductivity. Generally, a grounded metallic mesh, or a synthetic resin or metallic fiber mesh coated with a metal is used to block a leakage electromagnetic field. However, this technique has the disadvantage that light from the display cannot completely be transmitted, moiré fringes are produced, and a low yield causes an increase in cost. It has also been investigated to use a transparent electrically conductive film, typified by indium tin oxide (ITO), as an electromagnetic shielding layer. Such transparent electrically conductive films are usually required to have electric conductivity as expressed by a sheet resistance of not greater than $10^5$ Ω/sq. and preferably not greater than $10^3$ Ω/sq. Useful transparent electrically conductive films include, for example, metal films formed of gold, silver, copper, platinum, palladium and the like; oxide semiconductor films formed of indium oxide, tin(IV) oxide, zinc oxide and the like; and multilayer films formed by laminating metal films and high-refractive-index transparent films alternately. Of these, transparent electrically conductive films consisting of metal films have high electric conductivity, but fail to provide a high visible light transmittance owing to the reflection and absorption of light by the metal over a wide wavelength range. Transparent electrically conductive films consisting of oxide semiconductor films have higher transparency than those consisting of metal films, but are inferior in electric conductivity and near-infrared reflectivity.

Electromagnetic waves emerging from plasma displays are very intense, and no electromagnetic shielding material that uses a transparent electrically conductive layer formed of ITO and can block electromagnetic waves emitted by plasma displays has been available in the prior art. Moreover, neither electromagnetic shielding material that uses a transparent electrically conductive layer formed of ITO, can block electromagnetic waves emitted by plasma displays, and has such high transparency as not to impair the transparency of the displays, nor electromagnetic shielding material that additionally has near-infrared cutting-off characteristics has been available in the prior art.

In contrast, multilayer films formed by laminating metal films and high-refractive-index transparent films have excellent characteristics with respect to all of electric conductivity, near-infrared blocking characteristics and visible light transmittance, owing to the electric conductivity and optical properties possessed by metals such as silver, and the ability of the high-refractive-index transparent films to prevent the reflection of light by metals in a certain wavelength range.

A laminate comprising a multilayer film formed by laminating metal films and high-refractive-index transparent films is disclosed in Japanese Patent Publication No. 32436/1996 (JP, B2, 8-32436). However, this laminate does not have sufficient capability to block intense electromagnetic waves and near-infrared radiation emerging from plasma displays. Moreover, the use of this laminate as an optical filter for displays is not described therein.

Transparent electric conductors using thin films have the disadvantage that their film-bearing surfaces generally have poor scratch resistance. Moreover, transparent electric conductors comprising metal films or multilayer films formed by sandwiching metal films between high-refractive-index transparent films have the disadvantage that the films may undergo chemical or physical changes under the action of gases present in the environment for use. Especially when silver is used for the metal films, the silver aggregates and whitens under high-temperature and high-humidity conditions, resulting in a reduction in visibility required of optical filters for displays. Thus, when films or, in particular, multilayer films formed by laminating metal films and high-refractive-index transparent films alternately are used as transparent electrically conductive layers, these films have poor scratch resistance and environmental resistance and, therefore, must be provided with a transparent protective layer in order to protect the films.

Since an optical filter for displays is mounted on the whole surface of the display, it is required to have high transparency and low reflectivity. Moreover, anti-Newton ring properties are also required in some cases. For these reasons, an antireflection layer may be disposed on the film-bearing surface, either directly or through the medium of a transparent tacky material or adhesive. Similarly, an anti-Newton ring layer may be disposed on the film-bearing surface, either directly or through the medium of a transparent tacky material or adhesive. However, when a transparent protective layer, an antireflection layer, an anti-Newton ring layer and/or a transparent tacky material or adhesive layer are formed on the transparent electrically conductive layer of a transparent laminate, changes in the optical properties of the transparent laminate, particularly an increase in visible light reflectance and the accompanying reduction in transparency, are caused. As a result, the optical filter for displays using such a transparent laminate shows an increase in visible light reflectance and the accompanying reduction in transparency.

SUMMARY OF THE INVENTION

It is an object of the present invention to provide a transparent laminate having high transparency and, moreover, excellent electromagnetic shielding characteristics and near-infrared blocking characteristics.

It is another object of the present invention to provide a transparent laminate having high transparency and, moreover, excellent electromagnetic shielding characteristics serving to block electromagnetic waves emerging from plasma displays which are said to do harm to health, and excellent near-infrared blocking characteristics serving to block near-infrared radiation which may cause malfunction of electronic equipment.

It is still another object of the present invention to provide an optical filter for displays which has excellent electromagnetic shielding characteristics, excellent near-infrared blocking characteristics, high transparency, low reflectance, good weather resistance and good environmental resistance, in combination with antiglare properties and anti-Newton ring properties.

As a result of intensive investigations conducted in order to solve the above-described problems, the present inventors have now found a transparent laminate required to produce an optical filter for displays which can block very intense electromagnetic waves emerging from plasma displays, in particular, electromagnetic waves in the 20–100 MHz region, and can suppress intense near-infrared radiation emerging from the plasma displays to such an extent as not to cause equipment malfunction. The present invention has been completed on the basis of this finding.

The first two objects of the present invention are accomplished by a transparent laminate formed by laminating high-refractive-index transparent film layers and metal film layers consisting of silver or a silver-containing alloy on one major surface of a transparent substrate in such a way that a repeating unit comprising a combination of one high-refractive-index transparent film layer and one metal film layer in this order is repeatedly laminated three times or more, and further laminating at least a high-refractive-index transparent film layer thereon, wherein the laminated structure composed of the metal film layers and the high-refractive-index transparent film layers constitutes an electrically conductive surface, the electrically conductive surface has a sheet resistance of not greater than 3 Ω/sq., and the transparent laminate has a visible light transmittance of not less than 50%, and a light transmittance of not greater than 20% in a wavelength region longer than 820 nm.

In the transparent laminate of the present invention, the repeating unit comprising a combination of one high-refractive-index transparent film layer and one metal film layer is typically laminated three times. In this case, the second metal film layer as numbered from the transparent substrate side is preferably formed so as to be thicker than the first and third metal film layers.

In the transparent laminate of the present invention, it is also preferable that, when a transparent tacky material layer or a transparent adhesive layer is laminated on the high-refractive-index transparent film layer that is further from the transparent substrate, the resulting increase in visible light reflectance is not greater than 2%.

In the transparent laminate of the present invention, it is also preferable that the transparent substrate comprises a transparent polymeric molded material. The transparent substrate may contain a dye. It is also preferable that the high-refractive-index transparent film layers comprise, for example, layers consisting essentially of indium oxide.

The other object of the present invention is accomplished by an optical filter for displays comprising the transparent laminate of the present invention. It is preferable that the optical filter for displays of the present invention has a light transmittance of not greater than 10% in a wavelength region longer than 820 nm.

In the optical filter for displays of the present invention, it is also preferable that a metal-containing electrode and/or a transparent protective layer is formed on the electrically conductive surface of the transparent laminate. Moreover, the transparent laminate may be bonded to a transparent molded article. When a transparent protective layer is formed, it is preferable that the transparent protective layer has a moisture permeability of not greater than 10 g/m²·day. It is also preferable that the surface of the transparent protective layer is provided with minute irregularities having a size of 0.1 to 10 μm. The transparent protective layer may have antireflection ability. In this case, it is preferable that the surface of the transparent protective layer formed has a visible light reflectance of not greater than 2%. The transparent molded article may contain a dye. Furthermore, the optical filter for displays of the present invention may be provided with at least one layer selected from an antireflection layer, an antiglare layer and an anti-Newton ring layer. In addition, a dye-containing transparent molded material may be bonded thereto.

DESCRIPTION OF THE PREFERRED EMBODIMENTS

Figure 1:
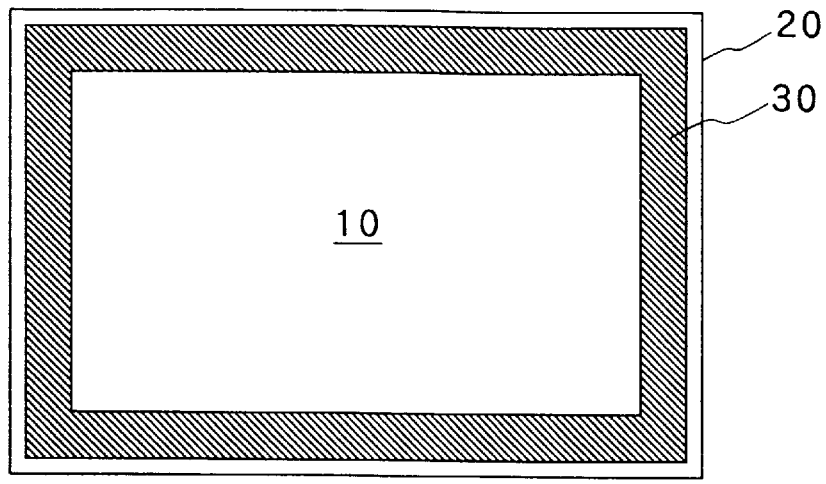
FIG. 1 is a plan view of an optical filter for displays in accordance with a preferred embodiment of the present invention as viewed from the display side.

The transparent laminate of the present invention is formed by laminating high-refractive-index transparent film layers and film layers consisting of silver or a silver-containing alloy (hereinafter referred to as metal film layers) successively on one major surface of a transparent substrate in such a way that a repeating unit comprising a combination of one high-refractive-index transparent film layer and one metal film layer is repeatedly laminated three times or more, and further laminating at least a high-refractive-index transparent film layer (B) thereon, and having a sheet resistance of not greater than 3 Ω/sq., a visible light transmittance of not less than 50%, and a light transmittance of not greater than 20% in a wavelength region longer than 820 nm.

In the present invention, the transparent substrate may comprise a molded material made of an inorganic compound such as glass or quartz, or a transparent molded material made of an organic polymer. Polymeric molded materials can preferably be used because they are light in weight and resistant to breakage. Any desired type of polymeric molded material may be used, provided that it is transparent in the visible wavelength region. Specific examples thereof include, but are not limited to, molded materials made of polyethylene terephthalate (PET), polyethersulfone, polystyrene, polyethylene naphthalate, polyarylate, polyether-ether-ketone (PEEK), polycarbonate, polypropylene, polyimide and triacetylcellulose. These transparent polymeric molded materials may be in the form of a plate or film, provided that their major surfaces are smooth. When a polymeric molded material in plate form is used as the substrate, a transparent laminate having excellent dimensional stability and mechanical strength can be obtained because of the excellent dimensional stability and mechanical strength of the substrate. Such a polymeric molded material may preferably be used especially in applications requiring dimensional stability and mechanical strength.

On the other hand, a transparent polymeric film has flexibility, so that a transparent electrically conductive layer can be continuously formed thereon according to a roll-to-roll process. Consequently, a continuous transparent laminate having a large area can be efficiently produced. Such a transparent laminate in film form can also preferably be used because it may be bonded to the glass screen of a display or the glass support of an optical filter for displays in order to prevent glass pieces from being scattered in the event of breakage. In this case, a polymeric film having a thickness of 10 to 250 μm is usually used. If the thickness of the film is less than 10 μm, its mechanical strength is insufficient for use as the substrate. If the thickness is greater than 250 μm, the film has insufficient flexibility and is not suitable for the purpose of winding it on a roll.

In order to improve the adhesion of the overlying film layer to the substrate, the surface of the substrate may previously be subjected to etching treatments such as sputtering, corona discharge treatment, flame treatment, ultraviolet ray irradiation and electron beam irradiation, and/or prime coating. Moreover, the adhesion between the transparent substrate and the overlying film layer can be enhanced, for example, by forming any desired inorganic material layer between the transparent substrate and the film layer. Specific examples of the inorganic material used for this purpose include, but are not limited to, nickel, chromium, gold, silver, platinum, zinc, zirconium, titanium, tungsten, tin, palladium, and alloys composed of two or more of these metals. Its thickness may be within limits which do not detract from its transparency, and is preferably in the range of about 0.02 to 10 nm. If the thickness of the inorganic material layer is unduly small, a sufficient adhesion-promoting effect is not produced, while if it is unduly large, its transparency is reduced from. When the overlying film layer consists of an oxide, all or part of the metal constituting this inorganic material layer is actually converted into a metal oxide. However, even if it is converted into a metal oxide, no influence is exerted on its adhesion-promoting effect. Furthermore, if necessary, the substrate may be subjected to dedusting treatments such as solvent cleaning and ultrasonic cleaning, before the overlying film layer is formed.

In the present invention, high-refractive-index transparent film layers and metal film layers consisting of silver or a silver-containing alloy are alternately laminated on one major surface of the above-described transparent substrate. During this process, each metal film layer is disposed so that it is sandwiched between two high-refractive-index transparent film layers.

Electromagnetic shielding is achieved by the reflection and absorption of electromagnetic waves in an electromagnetic shielding material. In order to absorb electromagnetic waves, the electromagnetic shielding material must have electric conductivity. An electromagnetic shielding material for plasma displays is required to have an electrically conductive layer with very low resistivity. Moreover, the electrically conductive layer must have a thickness above a certain limit in order to absorb all of the electromagnetic waves emerging from displays. In the present invention, however, if the electrically conductive layers (i.e., the metal film layers constituting principal electrically conductive layers) are thickened, the visible light transmittance is reduced in spite of the use of the high-refractive-index transparent film layers. Accordingly, it is important to increase the number of electromagnetic wave-reflecting interfaces by multilayer lamination and thus increase the degree of reflection of electromagnetic waves.

Shielding effectiveness indicative of electromagnetic shielding characteristics refers to the degree of attenuation of electromagnetic energy, and the magnitude thereof is expressed in decibel (dB). Shielding effectiveness (SE) is a parameter of relative evaluation as represented by the following equation (1), and greater values indicate better shielding effects. In this equation, $E_i$ is incident electric field intensity and $E_t$ is transmitted electric field intensity (i.e., the electric field intensity of the electromagnetic waves having passed through the shielding material), and both of them are expressed in V/m.

$$SE=20\ Log(E_i/E_t) \quad (1)$$

The regulated limit of a leakage electromagnetic field is indicated by an absolute value of radiation field intensity as expressed in dB$\mu$V/m. The regulated limit at a position 3 m away from the object of measurement is 50 dB$\mu$V/m in the case of products for industrial use and 40 dB$\mu$V/m in the case of products for domestic use. In a frequency band extending from 20 MHz to 100 MHz, the intensity of the radiation field from a plasma display exceeds 40 dB$\mu$V/m in plasma displays having a diagonal size of about 20 inches, and 50 dB$\mu$V/m in plasma displays having a diagonal size of about 40 inches. Thus, these types of plasma displays alone cannot be put to domestic use. From a practical point of view, the radiation field strength of a plasma display for domestic use must be reduced to not greater than 40 dB$\mu$V/m, preferably not greater than 35 dB$\mu$V/m, and more preferably not greater than 30 dB$\mu$V/m. Thus, if the radiation field strength of a plasma display alone is 50 dB$\mu$V/m, it is necessary to provide the plasma display with an electromagnetic shielding material having a shielding effectiveness of not less than 10 dB, preferably not less than 15 dB, and more preferably not less than 20 dB.

The present inventors have found that, in order to achieve a satisfactory shielding effect against the above-described plasma displays, the transparent laminate used as an electromagnetic shielding material must have a large number of electromagnetic wave-reflecting interfaces resulting from multilayer lamination and high electrical conductivity as expressed by a sheet resistance of not greater than 3 $\Omega$/sq., preferably not greater than 2.5 $\Omega$/sq., and more preferably not greater than 2 $\Omega$/sq.

Moreover, since plasma displays emit intense near-infrared radiation, light in the near-infrared region of the wavelength region of 800 to 1,000 nm must be blocked to such an extent as to be suitable for practical purposes. For example, it is necessary to reduce the light transmittance at 820 nm to not greater than 10%. With consideration for the demand for a decrease in the number of members and the limits of near-infrared absorbing filters using dyes, it is desirable that the electromagnetic shielding material itself has near-infrared blocking characteristics. Where a near-infrared absorbing dye is used in combination, the near-infrared blocking characteristics required of the electromagnetic shielding material become lower than the above-described performance requirements. However, if the near-infrared blocking characteristics of the electromagnetic shielding material are unduly low, the required amount of the near-infrared absorbing dye increases and hence cause a reduction in visible light transmittance. Consequently, it is desirable that the transparent laminate used as an electromagnetic shielding material has a light transmittance of not greater than 20% in a wavelength region longer than 820 nm.

Reflection by free electrons of a metal may be utilized to block near-infrared radiation. However, a thickened metal film layer causes a reduction in visible light transmittance as described above, while a thinner metal film layer weakens the reflection of infrared radiation. Accordingly, both the visible light transmittance and the overall thickness of the metal film layers can be increased by superposing two or more laminated structures each formed by sandwiching a metal film layer having a certain thickness between two high-refractive-index transparent film layers. Thus, the visible light transmittance, visible light reflectance, near-infrared transmittance, transmitted light color and reflected light color can be varied within certain limits by controlling the number of layers and/or the thickness of each layer in this laminated structure.

When an optical filter having a low visible light transmittance is mounted on a display, this causes a reduction in the definition of the picture. Accordingly, it is desirable that an optical filter for displays has a high visible light transmittance which should generally be not less than 50%, preferably not less than 60%, and more preferably not less than 70%. Consequently, the visible light transmittance of the transparent laminate should generally be not less than 50%, preferably not less than 60%, and more preferably not less than 70%.

Where the display has high luminance, a neutral-density (ND) filter may be required to enhance the contrast of the picture. In this case, it is preferable that the optical filter for displays used as an electromagnetic shielding material also functions as an ND filter. As a result, the optical filter for displays may be required to have a visible light transmittance of not greater than 80%. Moreover, the color of the light transmitted by the filter greatly influences the contrast of the display, and the like. As the color of the light transmitted by the optical filter for displays, green is unsuitable and neutral gray or neutral blue is required. Furthermore, a high visible light reflectance causes lighting equipment and the like to be sharply mirrored in the screen, resulting in reduced visibility. The color of the reflected light should preferably be an imperceptible color such as white, blue or purple. Also from this point of view, multilayer lamination which is easy to design and control optically is preferred. As used herein, visible light transmittance and visible light reflectance are values calculated according to JIS (Japanese Industrial Standard) R-3106 on the basis of the wavelength dependence of transmittance and reflectance.

In the transparent laminate of the present invention and the optical filter for displays of the present invention, the metal film layers consist of silver or a silver-containing containing alloy. Among others, silver is preferably used because it has high electric conductivity, excellent infrared reflection properties and excellent visible light transmission properties when it is laminated in multiple layers. However, silver lacks chemical and physical stability, so that it tends to deteriorate under the action of contaminants, water vapor, heat, light and other factors present in the environment. Accordingly, alloys composed of silver and at least one metal having high environmental stability (e.g., gold, platinum, palladium, copper, indium and tin) are also suitable for use in the present invention. Although no particular limitation is placed on the content of silver in such a silver-containing alloy, it is desirable that the electric conductivity and optical properties thereof do not differ substantially from those of silver alone. Specifically, the content of silver should preferably range from 50% by weight to less than 100% by weight. Since the addition of another metal to silver generally impairs the high electric conductivity and excellent optical properties of silver, it is desirable that, if possible, at least one of the metal film layers constituting the multilayer film is formed of unalloyed silver. When all of the metal film layers are formed of unalloyed silver, the resulting transparent laminate has high electric conductivity and excellent optical properties, but its environmental resistance is not always satisfactory.

As described above, the transparent laminate of the present invention is one characterized by a sheet resistance of not greater than 3 Ω/sq., a visible light transmittance of not less than 50%, and a light transmittance of not greater than 20% in a wavelength region longer than 820 nm and at least in the wavelength region of 820 to 1,000 nm. This transparent laminate is obtained by laminating high-refractive-index transparent film layers and silver or silver-containing alloy film layers (or metal film layers) on one major surface of a transparent substrate in such a way that a repeating unit comprising a combination of one high-refractive-index transparent film layer and one metal film layer is laminated three times or more, and further laminating at least one high-refractive-index transparent film layer thereon, and has many electromagnetic wave-reflecting interfaces serving for purposes of electromagnetic shielding, low resistivity, excellent near-infrared blocking ability, and very high transparency.

In the present invention, the repeating unit is preferably laminated three to six times. That is, the preferred layer constructions of the transparent laminate of the present invention are (1) a transparent substrate/a high-refractive-index transparent film layer/a metal film layer/a high-refractive-index transparent film layer/a metal film layer/a high-refractive-index transparent film layer/a metal film layer/a high-refractive-index transparent film layer, (2) a transparent substrate/a high-refractive-index transparent film layer/a metal film layer/a high-refractive-index transparent film layer/a metal film layer/a high-refractive-index transparent film layer/a metal film layer/a high-refractive-index transparent film layer/a metal film layer/a high-refractive-index transparent film layer, (3) a transparent substrate/a high-refractive-index transparent film layer/a metal film layer/a high-refractive-index transparent film layer/a metal film layer/a high-refractive-index transparent film layer/a metal film layer/a high-refractive-index transparent film layer/a metal film layer/a high-refractive-index transparent film layer/a metal film layer/a high-refractive-index transparent film layer, and (4) a transparent substrate/a high-refractive-index transparent film layer/a metal film layer/a high-refractive-index transparent film layer/a metal film layer/a high-refractive-index transparent film layer/a metal film layer/a high-refractive-index transparent film layer/a metal film layer/a high-refractive-index transparent film layer/a metal film layer/a high-refractive-index transparent film layer/a metal film layer/a high-refractive-index transparent film layer. In these layer constructions, the metal film layers consist of silver or a silver-containing alloy. If the repeating unit is laminated twice or less, it is difficult to achieve a low near-infrared transmittance, a low visible light reflectance and a low sheet resistance at the same time. If the repeating unit is laminated seven times or more, severe restrictions are imposed on the production equipment, the problem of productivity becomes serious, and a reduction in visible light transmittance is caused.

The thicknesses of the metal film layers consisting of silver or a silver-containing alloy can be determined by optical design and experiment, on the basis of their electric conductivity, optical properties and the like. No particular limitation is placed on the thicknesses thereof, provided that the resulting transparent laminate has the required characteristics. However, since it is necessary from the viewpoint of electric conductivity and the like that the metal atoms in the metal film layers are gathered in the form of a continuous film rather than islands, the thicknesses of the metal film layers should desirably be not less than 4 nm. On the other hand, the thicknesses thereof should desirably be not greater than 30 nm, because unduly thick metal film layers will show a reduction in transparency.

When a high-refractive-index transparent film layer adjacent to a metal film layer consists of an oxide, part of the metal constituting the metal film layer may actually be converted into a metal oxide. However, such a metal oxide in the metal film layer forms a very thin region and causes no problem from the viewpoint of optical design and film formation. Moreover, when the number (n) of the metal film layers is 3 or more, they do not necessarily have the same thickness. Furthermore, the metal film layers do not necessarily have the same composition. That is, according to the order of deposition of the metal film layers, the content of silver therein may be modified, or metals other than silver in alloy may be modified. In order to form the metal film layers, there may be employed any of conventionally known techniques such as sputtering, ion plating, vacuum deposition and metal plating.

As used herein, the high-refractive-index transparent film layers are layers which are transparent to visible light and have the effect of preventing the reflection of visible light by the metal film layers owing to the difference in refractive index between the high-refractive-index transparent film layers and the metal film layers. No particular limitation is placed on the type of the transparent films constituting the high-refractive-index transparent film layers, provided that the above-described requirements are met. However, a highly refractive material having a refractive index of not less than 1.6 and preferably not less than 1.7 for visible light is usually used. Specific examples of the material forming these transparent films include oxides of metals such as indium, titanium, zirconium, bismuth, tin, zinc, antimony, tantalum, cerium, neodymium, lanthanum, thorium, magnesium and gallium; mixtures of these metal oxides; and zinc sulfide. In these oxides and sulfide, the metal and oxygen or sulfur may be present in nonstoichiometric proportions, provided that their optical properties are not substantially modified. Among the above-described materials, indium oxide and a mixture of indium oxide and tin oxide (ITO) are preferably used because they not only have high transparency and a high refractive index, but also give a high film formation rate and good adhesion to the metal film layers. Moreover, by using an oxide semiconductor film (e.g., ITO) having relatively high electric conductivity for the high-refractive-index transparent film layers, the number of electromagnetic wave-absorbing layers can be increased and the electric conductivity of the transparent laminate can be improved.

The thickness of each high-refractive-index transparent film layer can be determined by optical design and experiment, on the basis of the optical properties of the transparent substrate, the thicknesses and optical properties of the metal film layers consisting of silver or a silver-containing alloy, the refractive index of the high-refractive-index transparent film layers, and the like. Although no particular limitation is placed on the thickness thereof, it is preferably in the range of 5 to 200 nm and more preferably 10 to 100 nm. When the number (m) of the high-refractive-index transparent film layers is 4 or more, they do not necessarily have the same thickness. Moreover, the high-refractive-index transparent film layers do not necessarily consist of the same transparent film material. In order to form the high-refractive-index transparent film layers, there may be employed any of conventionally known techniques such as sputtering, ion plating, ion beam assisted deposition, vacuum deposition and wet coating.

Among various film-forming techniques, sputtering permits easy control of the film thickness and is hence suitable for use in multilayer lamination. The use of sputtering enables the metal film layers consisting of silver or a silver-containing alloy and the high-refractive-index transparent film layers to be formed easily, repeatedly and continuously. As a specific example, a procedure for the continuous formation of high-refractive-index transparent film layers consisting essentially of indium oxide and metal film layers consisting of silver or a silver-containing alloy is described below. This procedure will be more fully described in the examples given later. High-refractive-index transparent film layers consisting essentially of indium oxide are formed by reactive sputtering using a metal target consisting essentially of indium or a sintered body target consisting essentially of indium oxide. In this reactive sputtering, a direct-current (DC) or radio-frequency (RF) magnetron sputtering process may be utilized by using an inert gas (e.g., argon) as the sputtering gas, oxygen as the reactive gas, and a pressure usually in the range of 0.1 to 20 mTorr. The suitable flow rate of oxygen gas may be experimentally determined on the basis of the resulting film formation rate and the like, and may be controlled so as to form films having a desired degree of transparency. Metal film layers consisting of silver or a silver-containing alloy are formed by sputtering using a target consisting of silver or a silver-containing alloy. For this purpose, a direct-current (DC) or radio-frequency (RF) magnetron sputtering process may be utilized by using an inert gas (e.g., argon) as the sputtering gas and a pressure usually in the range of 0.1 to 20 mTorr.

In the present invention, in order to improve the mechanical strength and environmental resistance of the transparent laminate, a hard coat layer having transparency may be disposed on the surface of the transparent substrate (A) opposite to the electrically conductive surface, or any desired protective layer may be disposed on the outermost surface on the side of the electrically conductive surface to such an extent as not to detract from the electric conductivity and optical properties of the transparent laminate. As used herein, the electrically conductive surface is the major surface of the transparent substrate on which the metal film layers and the high-refractive-index transparent film layers are laminated as described above to form a multilayer structure. Moreover, in order to improve the environmental resistance of the metal film layers and the adhesion between the metal film layers and the high-refractive-index transparent film layers, any desired inorganic material layers may be formed between the metal film layers and the high-refractive-index transparent film layers to such an extent as not to detract from the electric conductivity and optical properties of the transparent laminate. Specific examples of the inorganic material used for this purpose include copper, nickel, chromium, gold, platinum, zinc, zirconium, titanium, tungsten, tin, palladium, and alloys composed of two or more of these metals. The thickness thereof is preferably in the range of about 0.02 to 2 nm. If the thickness is unduly small, a sufficient adhesion-promoting effect is not produced. When the high-refractive-index transparent film layers consist of an oxide, all or part of the metal constituting these inorganic material layers is actually converted into a metal oxide. However, no influence is exerted on their adhesion-promoting effect.

Furthermore, a transparent laminate having a higher transmittance can be obtained by disposing any desired monolayer or multilayer antireflection layer on one major surface of the transparent laminate.

In order to obtain a transparent laminate having desired optical properties, the film material of each layer, the number of layers, the film thicknesses and the like may be determined by optical design according to a vector method using the refractive indices and extinction coefficients of the transparent substrate and the film materials, or a method using an admittance diagram and the like. Alternatively, film formation may be carried out by controlling the number of layers, the film thicknesses and the like while observing optical properties.

However, a transparent laminate formed by superposing one or more laminated structures comprising a metal film layer sandwiched between high-refractive-index transparent film layers generally tends to undergo changes in optical properties, particularly an increase in visible light reflectance and the accompanying reduction in transparency, if a functional film is bonded to the film-bearing surface through the medium of a tacky material or adhesive, or if a transparent protective layer is formed directly on the film-bearing surface in order to protect the films. This is attributable to the fact that optical design has been carried out by using a vacuum or air having a refractive index of 1 and an extinction coefficient of 0 as the entrance or exit medium for light entering or leaving the transparent laminate, and observations during film formation have been made under the same conditions. When optical design or film formation has been carried out so that the transparent laminate will have a low visible light reflectance in a vacuum or air, there is obtained a transparent laminate having a low visible light reflectance in the as-made state. However, if an adjacent layer such as a transparent tacky material or adhesive or a transparent protective layer is formed on the film-bearing surface, changes in optical properties (in particular, reflectance in the visible wavelength region) are caused. The reason for this is that, owing to changes in the optical properties (in particular, refractive index) of the entrance or exit medium for light, the interfacial reflection between the transparent film layer and the medium is altered and, moreover, the state of optical interference between various film layers and between each film layer and the medium is altered. In the following description, the multilayer laminated structure composed of metal film layers and high-refractive-index transparent film layers is referred to as the transparent multilayer film.

Accordingly, optical design may be carried out by selecting an adjacent layer intended to be formed on the film-bearing surface as the entrance or exit medium for light, and using the refractive index and extinction coefficient of this adjacent layer. The adjacent layer comprises a transparent tacky material or adhesive layer or transparent protective layer as described previously, and its thickness is usually not less than 1 μm and at least 0.5 μm or greater. Thus, the adjacent layer has a sufficiently large thickness as compared with the transparent multilayer film, and can hence be regarded as the entrance or exit medium for light. The refractive index and extinction coefficient of the material of the transparent tacky material or adhesive layer or transparent protective layer used for this purpose can be measured by using an Abbe refractometer, ellipsometry or the like. On the other hand, the refractive indices and extinction coefficients of the high-refractive-index transparent film layers and the metal film layers can be measured by ellipsometry or the like.

In the method using an admittance diagram, the optical admittance of a laminate is determined on the basis of the optical constants (i.e., refractive index and extinction coefficient) of a transparent substrate, the optical constants and thickness of a film formed on the transparent substrate, the optical constants and thickness of a first film formed thereon, the optical constants and thickness of a second film formed thereon, and so on. The interfacial reflection between the entrance or exit medium for light and the transparent film layer can be minimized by designing the optical admittance of the laminate so as to be as close as possible to the optical admittance of the medium. Accordingly, the interfacial reflection between the medium and the transparent multilayer film can be minimized by designing the optical admittance of the transparent laminate so as to be as close as possible to the optical admittance of the adjacent layer. In the Gaussian system of units, optical admittance is numerically equal to complex refractive index N. Complex refractive index N is given by the equation: $N=n-i\cdot k$ where n is the refractive index and k is the extinction coefficient. Complex refractive index and hence optical admittance depends on wavelength.

Since man has high visibility in the wavelength region of 500 to 600 nm, the visible light reflectance can be reduced on a visual basis by decreasing reflection in this wavelength region. Accordingly, optical design may be carried out with special consideration for optical admittance in this wavelength region.

In order to bond a functional film to the film-bearing surface of the transparent laminate, a transparent tacky material or adhesive is used. Specific examples thereof include acrylic adhesives, silicon-based adhesives, urethane adhesives, polyvinyl butyral (PVB) adhesives and ethylene-vinyl acetate (EVA) adhesives; and polyvinyl ether, saturated amorphous polyesters and melamine resins. These transparent tacky materials and adhesives have optical properties such as a refractive index of about 1.45 to 1.7 and an extinction coefficient (k) of approximately 0 as measured in the wavelength region of 500 to 600 nm.

It is preferable that, when a transparent tacky material or adhesive layer is formed on the surface of the transparent multilayer film [i.e., the outermost high-refractive-index transparent film layer], the reflection by the transparent laminate taking its front and back surfaces into consideration (i.e., the reflection at both surfaces of the transparent laminate) does not increase substantially. In other words, it is preferable that the reflection at both surfaces of the transparent substrate/transparent multilayer film/transparent tacky material or adhesive layer does not increase substantially as compared with the reflection by the transparent laminate alone (i.e., the reflection at both surfaces of the transparent substrate/transparent multilayer film). Specifically, it is preferably that the resulting increase in visible light reflectance is not greater than 2% and more preferably not greater than 1%. Furthermore, it is most preferable that the visible light reflectance does not increase or rather decreases. By using such a transparent laminate, its visible light reflectance remains low even when it is bonded with the aid of a transparent tacky material or adhesive. As a result, there can be obtained an optical filter for displays having a high visible light transmittance.

On the basis of optical design carried out according to the method using optical admittance with consideration for bonding with the aid of a transparent tacky material or adhesive, a transparent laminate having an optical admittance close to that of the transparent tacky material or adhesive can be obtained by laminating the high-refractive-index transparent film layers and the metal film layers consisting of silver or a silver-containing alloy on one major surface of the transparent substrate in such a way that a repeating unit comprising a combination of one high-refractive-index transparent film layer and one metal film layer is repeatedly laminated three times, and that the second metal film layer as numbered from the transparent substrate side is formed so as to be thicker than the first and third metal film layers. Thus, it has been found that there can be obtained a transparent laminate in which, when a transparent tacky material or adhesive layer is formed on the surface of the transparent multilayer film, the resulting increase in visible light reflectance is not greater than 2%.

The atomic compositions of the high-refractive-index transparent film layers and metal film layers formed in the above-described manner can measured according to a method such as Auger electron spectroscopy (AES), inductively coupled plasma (ICP)-atomic emission spectroscopy or Rutherford backscattering spectrometry (RBS). Moreover, the layer construction and the film thicknesses can be measured by observation in the direction of the depth by Auger electron spectroscopy, by the observation of a cross section under a transmission electron microscope, or the like. The film thicknesses are controlled by carrying out film formation on the basis of the previously established relationship between the film-forming conditions and the film formation rate, or by monitoring the film thickness during film formation by means of a quartz oscillator or the like.

The transparent laminate of the present invention is obtained by laminating a transparent multilayer film on a transparent substrate in the above-described manner. However, the transparent multilayer film has such poor scratch resistance and environmental resistance that, if the film is exposed, it is difficult to use this transparent laminate as an optical filter for displays. Accordingly, it is preferable to form a transparent protective layer on the transparent multilayer film for the purpose of protecting the transparent multilayer film. The transparent protective layer as used herein is a layer which is transparent in the visible wavelength region and has the function of protecting the transparent multilayer film. The transparent protective layer may comprise, for example, a film having this function; a transparent molded material (e.g., a polymeric film, polymeric sheet or glass sheet) having this function; or a transparent molded material on which a film having this function is formed.

The transparent protective layer is disposed on the transparent multilayer film formed on the transparent substrate. This may done by forming thereon a film having the function of protecting the transparent multilayer film according to coating, printing or other conventionally known film-forming technique, or by disposing thereon a transparent molded material on which a film having the function of protecting the transparent multilayer film is formed through the medium of any desired transparent tacky material or adhesive. Alternatively, the transparent protective layer may be formed by bonding a transparent molded material having the function of protecting the transparent multilayer film to the transparent laminate through the medium of any desired transparent tacky material or adhesive. No particular limitation is placed on the method for forming the transparent protective layer. Moreover, no particular limitation is placed on the type and thickness of the transparent molded material constituting the transparent protective layer.

Silver constituting the transparent laminate of the present invention lacks chemical and physical stability, so that it tends to deteriorate under the action of contaminants, water vapor and other factors present in the environment and hence undergo aggregation and whitening. Accordingly, it is important to cover the film-bearing surface of the transparent laminate with a layer having gas barrier properties so that the film may not be exposed to contaminants and water vapor present in the environment. It is preferable that the above-described transparent protective layer has gas barrier properties. When gas barrier properties are expressed in terms of moisture permeability, the required moisture permeability is not greater than 10 $g/m^2 \cdot day$, preferably not greater than 5 $g/m^2 \cdot day$, and more preferably not greater than 1 $g/m^2 \cdot day$. As used herein, the transparent protective layer having gas barrier properties is a layer which is transparent in the visible wavelength region and has gas barrier properties as defined above. This transparent protective layer may comprise, for example, a film having gas barrier properties; a transparent molded material on which a film having gas barrier properties is formed; or a transparent molded material having gas barrier properties.

In order to provide the transparent laminate with a transparent protective layer having gas barrier properties, a film having gas barrier properties may be formed thereon according to any of various conventionally known film-forming techniques such as chemical vapor deposition (CVD), vacuum deposition, sputtering, ion plating, coating and printing; a polymeric film, polymeric sheet or glass sheet having gas barrier properties may be bonded thereto through the medium of any desired transparent tacky material or adhesive; or a polymeric film or sheet on which a film having gas barrier properties is formed may be bonded thereto through the medium of any desired transparent tacky material or adhesive. Moreover, in the present invention, the transparent tacky material or adhesive used to bond the members to each other may have gas barrier properties. No particular limitation is placed on the method for forming this transparent protective layer having gas barrier properties.

Specific examples of the film having gas barrier properties include films formed of silicon oxide, aluminum oxide, tin oxide, indium oxide, yttrium oxide, magnesium oxide and mixtures thereof; films formed of such metal oxides having slight amount of other elements added thereto; and films formed of polyvinylidene chloride, acrylic resins, silicon-based resin, melamine resins, urethane resins and fluororesins. However, usable films having gas barrier properties are not necessarily limited thereto. The thickness of the film having gas barrier properties is in the range of about 10 to 200 nm for metal oxide films and about 1 to 100 $\mu$m for resin films, and it may have either a monolayer or a multilayer structure. However, it is to be understood that the thickness and structure of the film having gas barrier properties are not limited to those described above.

Polymeric films having low permeability to water vapor (i.e., low moisture permeability) include, for example, films formed of polyethylene, polypropylene, nylon, polyvinylidene chloride, vinylidene chloride/vinyl chloride copolymer, vinylidene chloride/acrylonitrile copolymer and fluororesins. In the present invention, no particular limitation is placed on the material and other properties of the polymeric film, provided that its moisture permeability is in the range of not greater than 10 $g/m^2 \cdot day$, preferably not greater than 5 $g/m^2 \cdot day$, and more preferably not greater than 1 $g/m^2 \cdot day$. Even if a polymeric film has a relatively high moisture permeability, its moisture permeability can be reduced by increasing its thickness or adding a suitable additive thereto. Accordingly, a film formed of polyethylene terephthalate, polycarbonate, polystyrene, polyarylate, polyetheretherketone, polyethersulfone or the like may be used as the transparent protective layer, if it has a sufficient thickness to achieve the above-described moisture permeability.

When an optical filter for displays in accordance with the present invention is used as a shield against electromagnetic waves, it is common practice to provide the electrically conductive surface of the transparent laminate with an electrode and thereby connect the transparent laminate electrically to the main body of the display. In forming the transparent protective layer, therefore, it is important to take care that the transparent protective layer does not prevent electrical connection between the metal-containing electrode formed on the electrically conductive surface of the optical filter for displays and the main body of the display. That is, the transparent protective layer should be formed so as to cover all of the film-bearing surface except the region on which the electrode is formed.

In addition to the formation of the above-described transparent protective layer, the deterioration of the metal film layers consisting of silver or a silver-containing alloy can also be inhibited by dissolving a compound capable of inhibiting the deterioration of silver and silver-containing alloys in any suitable solvent and applying this solution to the film-bearing surface and side faces of the transparent laminate.

In the present invention, any desired transparent tacky material or adhesive may be used to bond the members constituting the transparent laminate or optical filter for displays to each other. In this case, the tacky material or adhesive used in the central part through which light from the display passes must be transparent to visible light. The tacky material or adhesive may be in sheet or liquid form, provided that it has a bond strength sufficient for practical purposes. As the tacky material, a pressure-sensitive adhesive in sheet form is preferably used. Lamination is carried out by superposing members after the application of a tacky material in sheet form or an adhesive in liquid form. The adhesive in liquid form is an adhesive which, after it is applied to a member and another member is superposed thereon, is cured by allowing the assembly to stand at room temperature or by heating the assembly. Although the adhesive may be applied by any of various techniques such as bar coating, reverse coating, gravure coating, die coating and roll coating, the application technique is usually chosen with consideration for the type and viscosity of the adhesive, the amount of adhesive used, and the like. Although no particular limitation is placed on the thickness of the tacky material or adhesive layer, it is typically in the range of 0.5 to 50 $\mu$m and preferably 1 to 30 $\mu$m. After members are bonded with the aid of a tacky material or adhesive, the assembly is preferably kept under high-pressure and elevated-temperature conditions in order to remove any air entrapped between the members during bonding or dissolve it in the tacky material or adhesive and, moreover, improve the adhesion between the members. The high pressure used for this purpose is typically in the range of several to 20 atmospheres. The elevated temperature typically ranges from room temperature to 80° C., though it depends on the thermal resistance of each member. However, it is to be understood that the high-pressure and elevated-temperature conditions are not necessarily limited thereto.

Where a film having a certain function is bonded to the surface of the transparent laminate on which the transparent multilayer film is formed, it is more preferable to use a transparent tacky material or adhesive having gas barrier properties as expressed by a moisture permeability of not greater than 10 g/m$^2$·day, preferably not greater than 5 g/m$^2$·day, and more preferably not greater than 1 g/m$^2$·day when measured with the tacky material or adhesive alone or the laminate of the tacky material or adhesive and the film.

Generally, in electronic equipment requiring electromagnetic shielding, electromagnetic waves are blocked by disposing a metal layer within the case of the equipment or by using a case made of an electrically conductive material. In the case of a display requiring transparency, a window-like optical member having a transparent electrically conductive layer formed thereon (i.e., an optical filter for displays) is mounted on the display. Since electromagnetic waves absorbed in the electrically conductive layer induces electric charge, this electric charge must be allowed to escape by grounding the electrically conductive layer. Otherwise the electromagnetic shielding material acts as an antenna for emitting electromagnetic waves, resulting in a reduction in electromagnetic shielding power. Accordingly, the optical filter for displays of the present invention, having electromagnetic shielding ability imparted thereto, should preferably be ohmically connected to an electrically conductive part within the case for the main body of the display. To this end, part of the surface of transparent multilayer film constituting the electrically conductive part of the transparent laminate is exposed. Consequently, the various layers overlying the surface of the transparent multilayer film, including the above-described transparent protective layer, must be formed except the part in which electrical contact is made.

In order to establish good electrical contact with the transparent laminate, it is desirable to form a metal-containing electrode on the electrically conductive surface of the transparent laminate. No particular limitation is placed on the shape of the electrode. However, it is important that no gap which allows electromagnetic waves to leak exists between the optical filter for displays and the equipment requiring electromagnetic shielding, and that no layer of air exists between the metal-containing electrode and the transparent electrically conductive layer. Accordingly, it is preferable that the metal-containing electrode is continuously formed on a peripheral region of the electrically conductive surface of the transparent laminat e (i.e., the surface of the transparent multilayer film). That is, the metal-containing electrode is formed thereon in the form of a frame and without surface irregularities, except for the central region through which light from the display passes. The reason why the electrode is formed in this manner is that the electrode has the function of allowing the electric charge induced by electromagnetic waves absorbed in the electrically conductive layer to escape efficiently to the interior of the case for the main body of the display.

FIG. 1 is a plan view of an optical filter for displays having such an electrode in accordance with a preferred embodiment of the present invention. In this optical filter for displays, a transparent laminate 10 is formed on a transparent molded article 30, and an electrode 20 in the shape of a rectangular frame is formed on the surface of transparent laminate 10. Electrode 20 is disposed along the periphery of transparent laminate 10. However, it is to be understood that the shape of the electrode is not limited to that illustrated in FIG. 1.

If the transparent electrically conductive layer (or transparent multilayer film) of the transparent laminate, the metal-containing electrode, and the electrically conductive layer within the case of the display main body differ greatly in resistivity, an impedance difference exists at the contact parts thereof, and electromagnetic waves are emitted from these contact parts. Usually, the electrically conductive layer within the case comprising a metal layer and hence has a resistivity of not greater than $10^{-5}$ $\Omega$·cm, while the transparent electrically conductive layer has a resistivity of $10^{-5}$ to $10^{-4}$ $\Omega$·cm or greater. Accordingly, it is preferable that the electrode disposed on the electrically conductive surface of the transparent laminate has a resistivity of not greater than $1\times10^{-3}$ $\Omega$·cm.

From the viewpoint of electric conductivity, corrosion resistance and adhesion to the electrically conductive surface, the materials which can be used for the electrode include metals such as silver, gold, copper, platinum, nickel, aluminum, chromium, iron, zinc, and alloys composed of two or more of these metals; and silver pastes comprising a mixture of a synthetic resin and silver or a silver-containing alloy, or a mixture of borosilicate glass and silver or a silver-containing alloy. The electrode can be formed according to any of various conventionally known techniques such as metal plating, vacuum deposition and sputtering. Moreover, where a silver paste or the like is used for the electrode, additional techniques such as printing and coating may also be employed. Although no particular limitation is placed on the thickness of the metal-containing electrode, it typically ranges from several micrometers to several millimeters.

If the transparent laminate having no electrode formed thereon is used as an optical filter for displays, the transparent electrically conductive layer (i.e., the transparent multilayer film) constituting a current flow path is exposed in the part of this optical filter for displays which comes into contact with the main body of the display. Since the films used in the transparent electrically conductive layer have poor scratch resistance and environmental resistance as described above, the transparent electrically conductive layer exposed in the part for electrical contact with the main body of the display leads to a reduction in reliability and the like. Accordingly, when the transparent laminate is used as an optical filter for displays, it is important that the transparent electrically conductive layer is not exposed but has an electrode formed thereon. If the metal-containing electrode is sufficiently thick, this electrode serves as a protective layer for the transparent electrically conductive layer and can impart scratch resistance and environmental resistance thereto. Accordingly, it is desirable that the whole surface of the transparent electrically conductive layer is covered with the transparent protective layer or the electrode. If there is a part on which neither of them is formed, contaminants and water vapor present in the environment may invade the transparent electrically conductive layer through that part, resulting in a whitening of the metal film layers.

Where a polymeric film is used as the transparent substrate, it is desirable from the viewpoint of strength, planarity during use on a display, mounting method and the like that the transparent laminate formed in the above-described manner is bonded to a transparent molded article in the form of a plate having smooth major surfaces. When the transparent laminate is bonded to the transparent molded article, it is preferable to bond a major surface of the transparent molded article to the major surface of the transparent laminate opposite to the film-bearing surface, through the medium of a transparent tacky material or adhesive, because this facilitates the formation of an electrode and the establishment of electrical contact between the main body of the display and the optical filter for displays.

In the case of an optical filter for displays which does not require electromagnetic shielding characteristics, any desired major surface of the transparent laminate may be bonded to the transparent molded article. When the film-bearing surface of the transparent laminate is bonded to a major surface of the transparent molded article, at least one of the transparent tacky material or adhesive and the transparent molded article may serve as a transparent protective layer for the transparent laminate.

As the transparent molded article, a plastic plate which is transparent in the visible light region is preferred because of its high mechanical strength, light weight and resistance to breakage. A glass plate is also preferred in view of thermal stability because the glass plate has small heat deflection properties. Specific examples of the material of the plastic plate include, but are not limited to, acrylic resins such as polymethyl methacrylate (PMMA), polycarbonate resins and transparent ABS resins. Among others, PMMA can preferably be used because it is highly transparent over a wide wavelength range and has high mechanical strength. No particular limitation is placed on the thickness of the plastic plate used as the transparent molded article, provided that sufficient mechanical strength and sufficient rigidity to keep it flat without deflection are secured. However, its thickness is usually in the range of about 1 to 10 mm. When a glass plate is used as the transparent molded article, it is desirable to use a semi-tempered or tempered glass plate which has been subjected to a chemical strengthening treatment or air blast cooling treatment for enhancing its mechanical strength.

Where the optical filter for displays is used by mounting it in contact with the screen of a display, the degree of contact between the display screen and the optical filter for displays may vary from part to part, and the resulting gaps may produce Newton rings. Accordingly, it is preferable to form an anti-Newton ring layer on the major surface of the optical filter for displays which comes into contact with the display screen. Where electrical contact with the optical filter for displays is to be established for the purpose of electromagnetic shielding, this anti-Newton ring layer must not hinder the contact between the metal-containing electrode and the main body of the display.

In order to prevent lighting equipment and the like from being mirrored in the display screen and making the presented image hard to see, it is preferable to provide the optical filter for displays with an antireflection layer for suppressing the reflection of external light or an antiglare layer for imparting antiglare properties thereto. This antireflection layer or antiglare layer is formed on the major surface of the optical filter for displays which faces the user when it is mounted on the display, i.e., the major surface thereof opposite to the main body of the display. The reflection of external light by the optical filter for displays can further be reduced by forming an antireflection layer on the major surface of the optical filter for displays which faces the main body of the display when it is mounted on the display. Moreover, when reflection by the optical filter for displays is reduced by the formation of such an antireflection layer, an improvement in light transmittance can be achieved. When the antiglare layer and the antireflection layer are formed on the side of the electrically conductive surface of the transparent laminate, they must be disposed so as not to hinder the electrical contact between the metal-containing electrode and the optical filter for displays.

As used herein, the anti-Newton ring layer, antiglare layer and antireflection layer each refer to a film having the corresponding function, or a molded material on which a film having the corresponding function is formed. Each of these anti-Newton ring layer, antiglare layer and antireflection layer may be formed by forming a film having the desired function on the desired substrate according to coating, printing or other conventionally known film-forming technique, by bonding thereto a transparent molded material on which a film having the desired function is formed, or a transparent molded material having the desired function through the medium of any desired transparent tacky material or adhesive. No particular limitation is placed on the method for forming the anti-Newton ring layer, antiglare layer and antireflection layer. Moreover, no particular limitation is placed on the type and thickness of the transparent molded material used for this purpose.

Where the major surface of the transparent laminate on the transparent electrically conductive layer side is required to have anti-Newton ring properties, antiglare properties or antireflection properties, it is preferable that the transparent protective layer has such properties. In this case, it is unnecessary to form an anti-Newton ring layer, an antiglare layer or an antireflection layer on the transparent protective layer. Conversely, it is also preferable that the anti-Newton ring layer, the antiglare layer or the antireflection layer has the functions of the transparent protective layer, i.e., scratch resistance and gas barrier properties. By using such a layer or layers, the number of constituent members or constituent layers can be decreased. As a result, a reduction in the number of steps and in cost can be achieved and, moreover, interfacial reflection between the members can be decreased.

As to the antireflection layer, the elements constituting the antireflection film and the film thickness of each element may be determined by carrying out the above-described optical design with consideration for the optical properties of the substrate on which this antireflection layer is formed.

The performance of the antireflection layer should desirably be such that the antireflection film-bearing surface thereof has a visible light reflectance of not greater than 2%, preferably not greater than 1.5%, and more preferably not greater than 0.5%. The visible light reflectance of the antireflection film-bearing surface can be determined by measuring only the reflection occurring at the antireflection film-bearing surface after the reflection occurring at the opposite surface (i.e., the surface on which no antireflection film is formed) has been canceled, for example, by roughening the opposite surface with sand paper and painting it in black.

Specifically, the antireflection film may comprise a single-layer film formed of a material having a low refractive index of not greater than 1.5 and preferably not greater than 1.4 in the visible light region (e.g., a fluorine-containing transparent polymeric resin, magnesium fluoride, silicon-based resin or silicon oxide) so as to have, for example, a quarter-wavelength optical thickness. Alternatively, the antireflection film may also be formed by laminating two or more films consisting of inorganic compounds (e.g., metal oxides, fluorides, silicides, borides, carbides, nitrides or sulfides) or organic compounds (e.g., silicon-based resin, acrylic resins or fluororesins) and having different refractive indices. Single-layer antireflection films are easier to form, but are inferior to multilayer ones in antireflection properties. Multilayer antireflection films have antireflection properties over a wide wavelength range and are subject to less restriction in optical design based on the optical properties of the substrate. Inorganic compound films serving as antireflection films may be formed by any of conventionally known techniques such as sputtering, ion plating, ion beam assisted deposition, vacuum deposition and wet coating. Organic compound films serving as antireflection films may be formed by any of conventionally known techniques such as wet coating.

If the antireflection layer formed on the film-bearing surface of the transparent laminate (i.e., the antireflection film, the transparent molded material on which the antireflection film is formed, or the transparent molded material having antireflection properties) has gas barrier properties, this is preferable in that the number of members can be decreased. Specific examples of this antireflection layer include polyethylene terephthalate films or fluororesin films on which a single layer of silicon oxide or a fluororesin is formed to a quarter-wavelength optical thickness. These films have low permeability to water vapor and good antireflection properties. Moreover, scratch resistance can be imparted thereto by forming them on the transparent multilayer film.

As used herein, the anti-Newton ring layer and the antiglare layer are both layers which are transparent to visible light and are provided with minute surface irregularities having a size of about 0.1 to 10 $\mu$m, except that they differ in purpose. The anti-Newton ring layer has antiglare properties. Specifically, the anti-Newton ring layer and the antiglare layer are formed by dispersing particles of an inorganic or organic compound (e.g., silica, a melamine resin or an acrylic resin) in a heat-curable or photo-curable resin (e.g., an acrylic resin, silicon-based resin, melamine resin, urethane resin, alkyd resin or fluororesin) to prepare an ink, applying this ink to the substrate according to a technique such as bar coating, reverse coating, gravure coating, die coating or roll coating, and the curing the ink. The average diameter of the particles may be, for example, in the range of 1 to 40 $\mu$m. Alternatively, the anti-Newton ring layer and the antiglare layer may also be formed by coating a substrate with a heat-curable or photo-curable resin (e.g., an acrylic resin, silicon-based resin, melamine resin, urethane resin, alkyd resin or fluororesin), pressing the coated substrate against a mold having a desired haze or surface state, and then curing the resin. Furthermore, the antiglare layer may also be formed by treating a substrate with a chemical agent (e.g., by etching a glass sheet with hydrofluoric acid). In this case, the haze of the antiglare layer can be controlled according to the treating time and the etching properties of the chemical agent. In short, it is important that the anti-Newton ring layer and the antiglare layer have appropriate surface irregularities, and the method for forming the anti-Newton ring layer and the antiglare layer are not necessarily limited to the above-described ones. The anti-Newton ring layer and the antiglare layer should generally have a haze of 0.5 to 20% and preferably 1 to 10%. If the haze is unduly low, they have insufficient antiglare ability or anti-Newton ability. If the haze is unduly high, the transmittance of parallel rays is reduced, resulting in poor visibility of the display.

Where the film-bearing major surface of the transparent laminate is required to have anti-Newton ring properties and/or antiglare properties, a layer comprising a film having such properties, a transparent molded material on which a film having such properties is formed, or a transparent molded material having such properties is disposed thereon. If the aforesaid layer has gas barrier properties, this is preferable in that the number of members can be decreased. One specific example of such a layer is the aforesaid transparent protective layer in which particles of an inorganic or organic compound as described above is dispersed to impart anti-Newton ring properties and/or antiglare properties thereto. If a polyethylene terephthalate film on which a film having anti-Newton ring properties and/or antiglare properties is formed has low permeability to water vapor, this polyethylene terephthalate film may be bonded to the film-bearing surface with the aid of a transparent tacky material or adhesive. Moreover, scratch resistance can be imparted thereto by forming it on the transparent multilayer film.

For example, where the optical filter for displays is mounted away from, and not in contact with, the surface of the screen of a display, the antiglare layer of the optical filter for displays lies a little away from the surface of the display. As a result, the antiglare layer may cause the diffusion of the picture, resulting in a blur thereof. In such a case, it is important to choose an antiglare layer having a haze which can maintain antiglare properties and does not cause any blur of the picture when the optical filter is mounted a little away from a display.

Furthermore, in order to impart scratch resistance to the optical filter for displays, the surfaces thereof (in particular, the surface opposite to the display) may be provided with a hard coat layer having at least such a degree of transparency as not to impair the properties (in particular, optical properties) of the optical filter for displays. The antiglare layer may function as a hard coat layer, or the antireflection layer may function as a hard coat layer.

When the transparent multilayer film-bearing surface of the transparent laminate is required to have hard coat properties, it is preferable to impart hard coat properties to the transparent protective layer.

The surface of a display tends to attract dust owing to electrostatic charge and, moreover, such static electricity may be discharged upon contact with a human body to give an electric shock thereto. Accordingly, it may be required to subject the display to an antistatic treatment. The problem of electrostatic charge can be solved by forming an electrically conductive layer directly on the surface of the display or bonding a member having an electrically conductive layer to the surface of the display, and grounding these electrically conductive layers. Accordingly, in order to impart antistatic properties to the optical filter for displays, an electrically conductive layer may be formed on the user-side surface (i.e., the surface opposite to the display when the optical filter is mounted on the display). The electrically conductive layer used for this purpose may be one which has a sheet resistance of about $10^8$ Ω/sq. or less and does not detract from the transparency or resolution of the display screen. This electrically conductive layer may comprise a transparent electrically conductive film.

When the optical filter for displays has antistatic properties, a transparent electrically conductive layer for antistatic use may be formed in any of the following manners. That is, (1) a transparent electrically conductive layer is formed on the antiglare layer, or (2) electrical conductivity is imparted to the antireflection layer or the antiglare layer. In the method (1), a transparent electrically conductive layer for antistatic use is provided by forming a well-known transparent electrically conductive film consisting, for example, of ITO in the previously described manner, or bonding a polymeric film on which an ITO film is previously formed. In this case, it is important that the formation of a transparent electrically conductive layer for antistatic use does not detract substantially from the antiglare properties. When a transparent electrically conductive layer for antistatic use is formed on the antiglare layer, a thin film which does not detract from its antiglare properties may be effectively used because the electrical conductivity required for antistatic purposes is relatively low. In the method (2), electrically conductive ultrafine particles such as ultrafine particles of ITO or tin oxide may be dispersed in the antiglare layer. When electrical conductivity is imparted to the antireflection layer, this may be done by carrying out the optical design of the antireflection layer while considering a transparent electrically conductive film to be a constituent element thereof. Specific examples of such an antireflection layer include one composed of substrate/ITO/silicon-containing compound/ITO/silicon-containing compound and one composed of substrate/ITO/fluorine-containing compound.

The transparent laminate of the present invention has, in addition to electromagnetic shielding characteristics, near-infrared blocking characteristics. However, if the light transmittance of the transparent laminate alone in a wavelength region longer than 820 nm exceeds 10%, a near-infrared absorbing dye may be used in combination to supplement the near-infrared blocking characteristics of the transparent laminate. Moreover, as described previously, it is desirable that optical filters for displays have a transmitted light color such as neutral gray or neutral blue. Accordingly, in order to control the color tone of the laminate and thereby obtain an optical filter for displays having a transmitted light color as described above, a commercially available dye having an absorption band in the visible light region may be used in combination as a color tone dye.

A dye may be contained by (1) containing the dye in the transparent substrate of the transparent laminate, (2) containing the dye in any one of the transparent molded article, transparent protective layer, antireflection layer, antiglare layer, anti-Newton ring layer and hard coat layer which are bonded to or formed on the transparent laminate, (3) containing the dye in any one of the transparent tacky material or adhesive layers used for bonding purposes, or (4) bonding, as one constituent element of the optical filter for displays, a dye-containing transparent molded material (F) between any two members constituting the optical filter for displays, with the aid of any desired tacky material or adhesive. The optical filter for displays containing a dye therein has excellent near-infrared blocking characteristics owing to the supplementation of the near-infrared blocking ability associated with the films when the dye is a near-infrared absorbing dye, or has an excellent color tone of transmitted light when the dye is a color tone dye. As used herein, the term "dye" means a toning dye having an absorption band in the visible light region or a near-infrared absorbing dye having an absorption band in the near-infrared wavelength region.

No particular limitation is placed on the type of the near-infrared absorbing dye used in the present invention, provided that it can supplement the near-infrared blocking characteristics of the laminate and can absorb intense near-infrared radiation emerging from plasma displays to such an extent as to be suitable for practical purposes. Moreover, no particular limitation is placed on the concentration of the near-infrared absorbing dye, provided that it is within the limits which do not affect the visible light transmittance to such an extent as to be suitable for practical purposes.

However, if the near-infrared absorbing dye comprises a dithiol complex compound of the following general formula (1) or (2) or a mixture of two or more such compounds, the optical filter for displays of the present invention can have more excellent near-infrared blocking characteristics. Compounds of the following general formulae (1) and (2) are on the market and readily available.

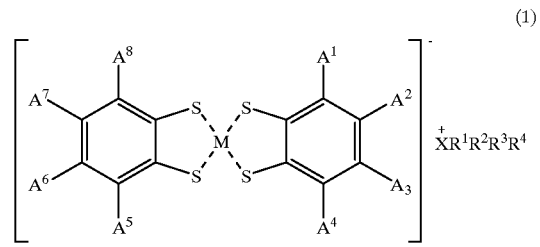

(1)

wherein $A^1$ to $A^8$ each independently represent a hydrogen atom, a halogen atom, a nitro group, a cyano group, a thiocyanate group, a cyanate group, an acyl group, a carbamoyl group, an alkylaminocarbonyl group, an alkoxycarbonyl group, an aryloxycarbonyl group, a substituted or unsubstituted alkyl group, a substituted or unsubstituted aryl group, a substituted or unsubstituted alkoxy group, a substituted or unsubstituted aryloxy group, a substituted or unsubstituted alkylthio group, a substituted or unsubstituted arylthio group, a substituted or unsubstituted alkylamino group, or a substituted or unsubstituted arylamino group, or any two adjacent substituents may be joined through the medium of a connecting group; $R^1$ to $R^4$ each independently represent a substituted or unsubstituted alkyl group or a substituted or unsubstituted aryl group; M represents nickel, platinum, palladium or copper; and X represents a nitrogen atom or a phosphorus atom.

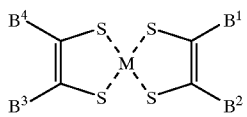

(2)

wherein $B^1$ to $B^4$ each independently represent a hydrogen atom, a cyano group, an acyl group, a carbamoyl group, an alkylaminocarbonyl group, an alkoxycarbonyl group, an aryloxycarbonyl group, a substituted or unsubstituted alkyl group, or a substituted or unsubstituted aryl group, or any two adjacent substituents may be joined together through the medium of a connecting group; and M represents nickel, platinum, palladium or copper.

No particular limitation is placed on the concentration of a commercially available color tone dye having an absorption band in the visible light region, though it depends on the absorption coefficient of the dye, the color tone of the transparent laminate requiring modifying, the color tone required of the transparent laminate and hence the optical filter for displays, the visible light transmittance and the like. Two or more dyes having different absorption wavelengths in the visible light region may be used in combination.

As used herein, the term "contain" means not only the state of a dye contained in the interior of a base material, but also the state of a dye coated on a surface of a base material, the state of a dye sandwiched between base materials, and the like. As used herein, the base material may comprise any of the transparent substrate of the transparent laminate, the transparent molded article to which the transparent laminate is bonded, the transparent protective layer, the antireflection layer, the antiglare layer, the anti-Newton ring layer and the hard coat layer, or the transparent molded material which is used to contain a dye and is contained in an optical filter for displays. In the transparent protective layer, the antireflection layer, the antiglare layer, the anti-Newton ring layer and the hard coat layer, a film having the corresponding function may contain a dye, or a film having the corresponding function may be formed on a dye-containing transparent molded material. The dye-containing transparent molded material may comprise a transparent plastic plate, a transparent polymeric film, a glass sheet or the like. As described above, the content of the dye depends on the optical properties of the transparent laminate and the optical properties required of the optical filter for displays.

No particular limitation is placed on the method for making a dye-containing molded material by use of a dye. For example, any of the following three methods may be employed.

(1) A method which comprises kneading a resin together with a dye and hot-molding it into a plastic plate or a polymeric film.

(2) A method which comprises preparing a coating composition containing a dye, and coating it on a transparent plastic plate, a transparent polymeric film or a transparent glass sheet.

(3) A method which comprises incorporating a dye into an adhesive and using it to make a composite plastic plate, a composite polymeric film, a glass laminate or the like.

First of all, in the method (1) which comprises kneading a resin together with a dye and hot-molding it, it is preferable to use a resin material which has as high transparency as possible when formed into a plate or film. Specific examples thereof include, but are not limited to, vinyl compounds and addition polymers thereof, such as polyethylene, polystyrene, polyacrylic acid, polyacrylates, polyacrylonitrile, polyvinyl acetate, polyvinyl chloride and polyvinyl fluoride; polymethacrylic acid, polymethacrylate, polyvinylidene chloride, polyvinylidene fluoride, polyvinylidene cyanide; copolymers of vinyl compounds or fluorine-containing compounds, such as vinylidene fluoride/trifluoroethylene copolymer, vinylidene fluoride/tetrafluoroethylene copolymer and vinylidene cyanide/vinyl acetate copolymer; fluorine-containing compounds such as polytrifluoroethylene, polytetrafluoroethylene and polyhexafluoroethylene; polyamides such as nylon 6 and nylon 66; polyimides; polyurethane; polypeptide; polyesters such as polyethylene terephthalate; polycarbonate; polyethers such as polyoxymethylene, polyethylene oxide and polypropylene oxide; epoxy resins; polyvinyl alcohol; and polyvinyl butyral.

As to the method of making, the processing temperature, film-forming conditions and the like may vary somewhat according to the dye used and the polymeric molded article constituting the base. However, there may usually employed (i) a method in which a dye is added to a powder or pellets for the making of a polymeric molded article constituting the base, and the resulting blend is melted at 150–350° C. and formed into a resin plate; (ii) a method in which a film is extruded by means of an extruder; or (iii) a method in which a raw film is extruded by means of an extruder and then uniaxially or biaxially stretched 2- to 5-fold at 30–120° C. to form a film having a thickness of 10 to 200 $\mu$m. Additives commonly used in the molding of resins, such as ultraviolet absorbers and plasticizers, may be added during kneading. Although the amount of dye added may vary according to the absorption coefficient of the dye, the thickness of the polymeric molded article being made, the desired absorptivity, the desired visible light transmittance and the like, it usually ranges from 1 ppm to 20% by weight.

Specific examples of the method (2) which comprises preparing a coating composition and coating it include a method in which a dye is dissolved in a binder resin and an organic solvent to prepare a coating composition, and a method in which a dye is pulverized to a particle size of several micrometers or less and dispersed in an acrylic emulsion to prepare an aqueous coating composition. In the former method, a resin selected from aliphatic ester resins, acrylic resins, melamine resins, urethane resins, aromatic ester resins, polycarbonate resins, aliphatic polyolefin resins, aromatic polyolefin resins, polyvinyl resins, polyvinyl alcohol resin, modified polyvinyl resins (e.g., PVB and EVA) and copolymer resins thereof is usually used as the binder resin.

As the solvent, there is used a solvent selected from halogenated hydrocarbons, alcohols, ketones, esters, aliphatic hydrocarbons, aromatic hydrocarbons, ethers and mixtures thereof.

Although the concentration of the dye may vary according to the absorption coefficient of the dye, the thickness of the coating, the desired absorptivity, the desired visible light transmittance and the like, it is usually in the range of 0.1 to 30% by weight based on the weight of the binder resin. The concentration of the binder resin is usually in the range of 1 to 50% by weight based on the total weight of the coating composition.

An acrylic emulsion-based aqueous coating composition may similarly be prepared by dispersing a pulverized dye (having a particle size of 50 to 500 nm) in an uncolored acrylic emulsion coating material. Additives commonly used in coating compositions, such as ultraviolet absorbers and antioxidants, may be added to the above coating composition.

The coating composition prepared according to any of the above-described method is coated on a transparent polymeric film, a transparent resin plate, a glass sheet or the like by means of a bar coater, a blade coater, a spin coater, a reverse coater, a die coater, a spray gun or the like. Thus, there is obtained a dye-containing base material. In order to protect the coated surface, a protective layer may be formed on the coated surface, or a transparent resin plate, a transparent polymeric film or the like may be bonded to the coated surface. Moreover, cast films are also within the scope of this method.

In the method (3) which comprises incorporating a dye into an adhesive and using it to make a composite resin plate, a composite resin film, a glass laminate or the like, there may be used common adhesives for resins, such as silicon-based, urethane and acrylic adhesives; and well-known transparent adhesives for glass laminates, such as polyvinyl butyral (PVB) adhesives and ethylene-vinyl acetate (EVA) adhesives. Using an adhesive containing 0.1 to 30% by weight of a dye, transparent resin plates, a resin plate and a polymeric film, a resin plate and a glass sheet, polymeric films, a polymeric film and a glass sheet, or glass sheets are bonded together to make a composite plastic plate, a composite polymeric film, a glass laminate or the like.

The aforesaid adhesive containing a dye may be used to bond various members such as the transparent laminate, the transparent molded article to which the transparent laminate is bonded, the transparent protective layer, the antireflection layer, the antiglare layer, the anti-Newton ring layer and the dye-containing transparent molded material.

Moreover, optical filters for plasma displays are required to block intense near-infrared radiation from plasma displays in the wavelength region of 800 to 1,000 nm. If it is necessary for this purpose, two or more dithiol complex compounds of the above general formulae (1) and/or (2) may be used in combination. If desired, one or more other near-infrared absorbing dyes may be added thereto. Furthermore, in order to obtain an optical filter for displays having a desired color tone in addition to near-infrared blocking ability, one or more dyes having an absorption band in the visible light region may be added thereto.

In order to improve the light resistance of a dye-containing optical filter for displays, a transparent film containing a UV absorber (i.e., a UV cutoff filter) may be bonded thereto or a UV absorber, together with the dye(s), may be incorporated thereinto.

The construction of optical filters for displays in accordance with the present invention may be modified as required. The transparent laminates and optical filters for displays of the present invention have excellent near-infrared blocking ability. Moreover, the optical filters for displays of the present invention are less liable to deterioration by environmental factors such as humidity, heat and light, as compared with near-infrared blocking filters using common organic dyes alone to block near-infrared radiation. Furthermore, since dithiol complex compounds of the above general formulae (1) and (2) have excellent environmental resistance, optical filters for displays which are less liable to deterioration can also be obtained when such a compound or a mixture of such compounds is used as a dye. Accordingly, the transparent laminates and optical filters for displays of the present invention can preferably be used as near-infrared blocking filters.

The above-described construction of transparent laminates and optical filters for displays in accordance with the present invention are explained below in greater detail.

Figure 2:
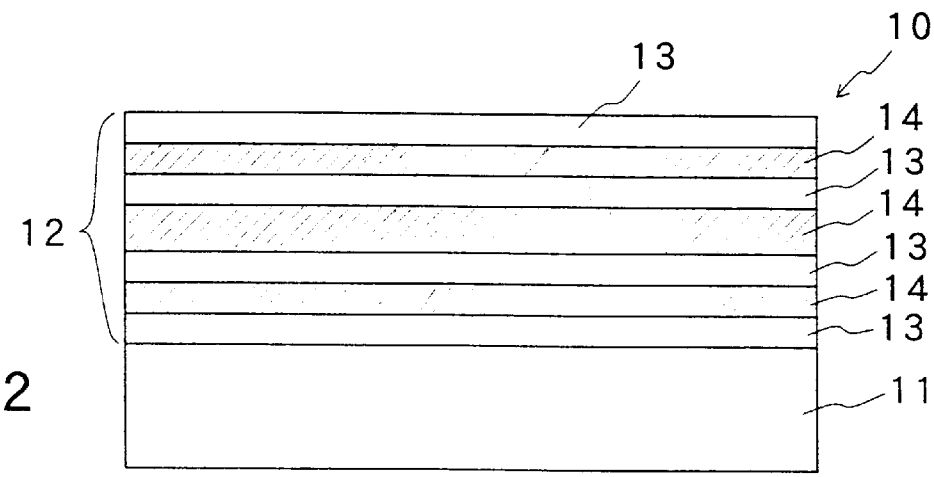
FIG. 2 is a sectional view of a transparent laminate in accordance with a preferred embodiment of the present invention.

FIG. 2 illustrates a transparent laminate 10 in accordance with a preferred embodiment of the present invention. This transparent laminate 10 comprises a transparent substrate 11 consisting of a polymeric film or the like, and a transparent electrically conductive layer (i.e., transparent multilayer film) 12 disposed on one major surface of transparent substrate 11. Transparent electrically conductive layer 12 is formed by laminating four high-refractive-index transparent film layers 13 and three metal film layers 14 alternately on the major surface of transparent substrate 11. Typically, high-refractive-index transparent film layers 13 consist essentially of indium oxide. Metal film layers 14 consist of silver or a silver-containing alloy. In the illustrated transparent laminate 10, the three metal film layers 14 are formed in such a way that the middle metal film layer 14 is thicker than the other metal film layers 14.

Figure 3:
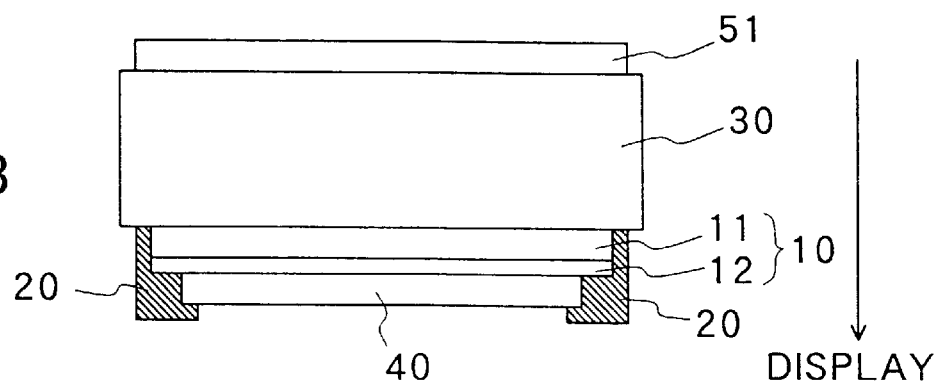
FIG. 3 is a sectional view of an optical filter for displays in accordance with a preferred embodiment of the present invention.

FIG. 3 illustrates an optical filter for displays in accordance with a preferred embodiment of the present invention, which is made by using transparent laminate 10 illustrated in FIG. 2. The major surface of transparent laminate 10 opposite to transparent electrically conductive layer 12 is bonded to one major surface of a transparent molded article 30. To the other major surface of transparent molded article 30 is bonded an antireflection layer 51 comprising an antireflection film. To the surface of transparent electrically conductive layer 12, except its peripheral region, is bonded a transparent protective layer 40. On the peripheral region of the surface of transparent electrically conductive layer 12, an electrode 20 is formed so as to cover the side faces of transparent electrically conductive layer 12. Electrode 20 contains a metal and serves to ground transparent electrically conductive layer 12. The two-dimensional shape of electrode 20 is as shown in FIG. 1. If a plasma display on which this optical filter for displays is to be mounted is provided on a peripheral region of the screen with an electrically conductive layer for grounding purposes, the electrically conductive layer of the plasma display comes into electrical contact with electrode 20 of the optical filter for displays when the optical filter for displays is mounted on the plasma display, so that the grounding of transparent electrically conductive layer 12 is effected. Moreover, by means of a frame-like member, the optical filter for displays and the screen of the display are electrically connected without leaving any space therebetween, so that a marked reduction in leakage electromagnetic waves can be achieved. In order to protect transparent electrically conductive layer 12, it is important that no space is left between the part of transparent electrically conductive layer 12 covered with transparent protective layer 40 and the part of transparent electrically conductive layer 12 covered with electrode 20.

According to use and mounting method, the optical filters for displays of the present invention can be broadly classified into the following four types. However, it is to be understood that the present invention is not limited thereto.

(1) A first type is an optical filter for displays which has electromagnetic shielding ability and near-infrared blocking ability and is mounted so that a major surface thereof is in contact with surface of the screen of a display.

(2) A second type is an optical filter for displays which has electromagnetic shielding ability and near-infrared blocking ability and is mounted so that a major surface thereof lies away from the surface of the screen of a display.

(3) A third type is an optical filter for displays which has near-infrared blocking ability and is mounted so that a major surface thereof is in contact with the surface of the screen of a display.

(4) A fourth type is an optical filter for displays which has near-infrared blocking ability and is mounted so that a major surface thereof lies away from the surface of the screen of a display.

Now, according to each of the above-described mounting methods, transparent laminates and optical filters for displays in accordance with preferred embodiments of the present invention are described below with reference to the accompanying drawings.

Figure 4:
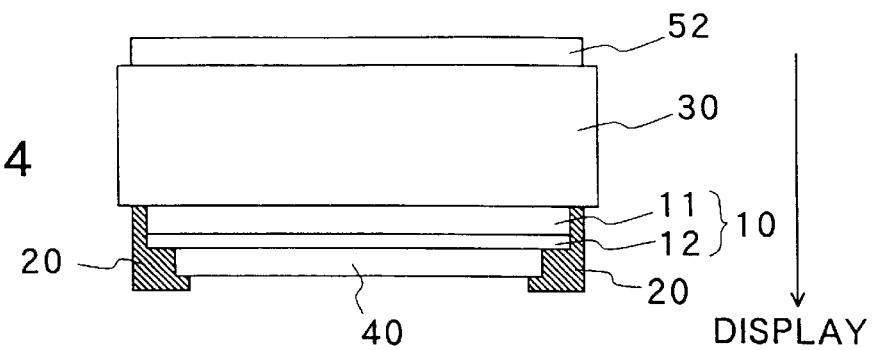
FIG. 4 is a sectional view of an optical filter for displays in accordance with another embodiment of the present invention.

In the case of the aforesaid type (1), when the display has an electrically conductive layer for grounding purposes in the side of the display screen, the optical filter for displays in which the transparent protective layer functions as an anti-Newton ring layer is usually mounted on the display so that the electrode of the filter faces the display. If an optical filter for displays as shown in FIG. 3 is used, it is composed of (metal-containing electrode 20 and transparent protective layer 40)/transparent laminate 10/transparent molded article 30/antireflection layer 51 in that order as viewed from the display side. Alternatively, antireflection layer 51 may be replaced by an antiglare layer 52 as shown in FIG. 4.

Figure 5:
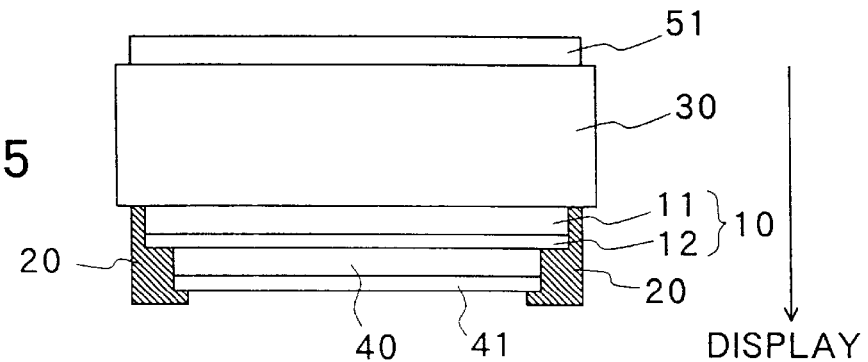
FIG. 5 is a sectional view of an optical filter for displays in accordance with still another embodiment of the present invention.

On the other hand, when transparent protective layer 40 does not function as an anti-Newton ring layer, an anti-Newton ring layer 41 is further bonded to transparent protective layer 40 as shown in FIG. 5. In this case, the optical filter for displays is composed of (electrode 20 and anti-Newton ring layer 41)/transparent protective layer 40/transparent laminate 10/transparent molded article 30/antireflection layer 51 in that order as viewed from the display side. Of course, antireflection layer 51 may be replaced by an antiglare layer 52.

Figure 6:
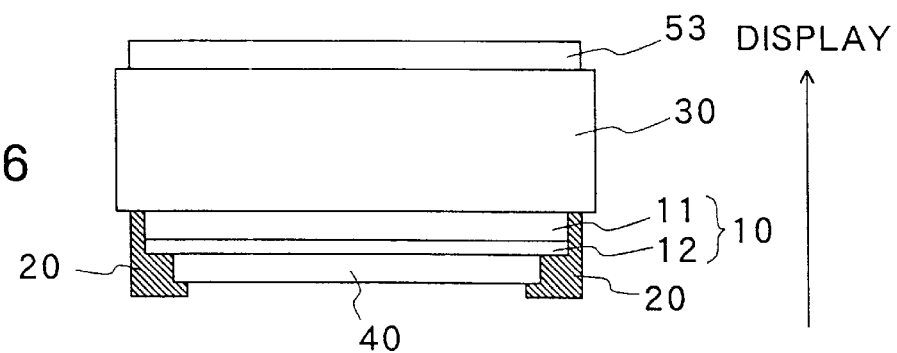
FIG. 6 is a sectional view of an optical filter for displays in accordance with a further embodiment of the present invention.
Figure 7:
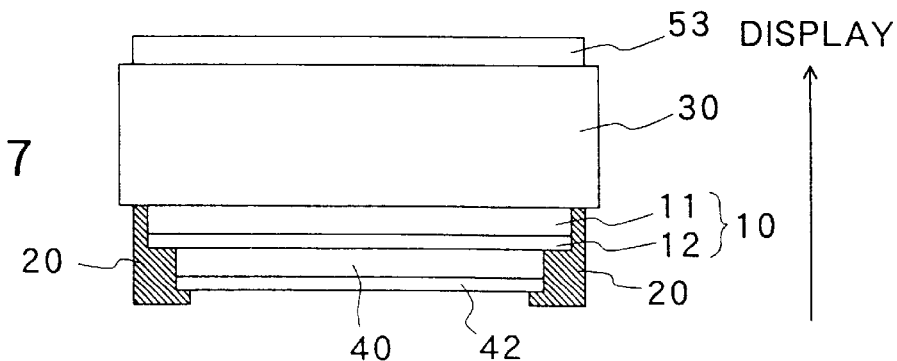
FIG. 7 is a sectional view of an optical filter for displays in accordance with a further embodiment of the present invention.
Figure 8:
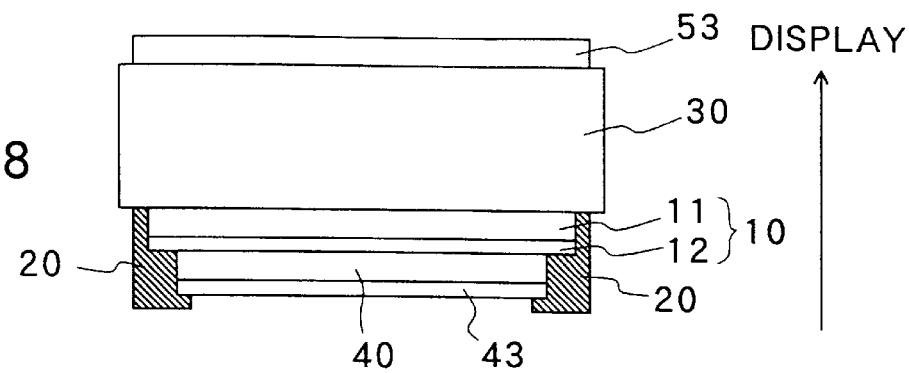
FIG. 8 is a sectional view of an optical filter for displays in accordance with a further embodiment of the present invention.

Moreover, when the display has an electrically conductive layer for grounding purposes in the side of user, the positional relationship between transparent molded article 30 and transparent laminate 10 may be reversed. In this case, if the transparent protective layer functions as an antiglare layer or an antireflection layer, the optical filter for displays is composed as shown in FIG. 6 so that it consists of anti-Newton ring layer 53/transparent molded article 30/transparent laminate 10/(transparent protective layer 40 and metal-containing electrode 20) in that order as viewed from the display side. If transparent protective layer 40 does not function as an antiglare layer or an antireflection layer, the optical filter for displays is composed as shown in FIG. 7 so that it consists of anti-Newton ring layer 53/transparent molded article 30/transparent laminate 10/transparent protective layer 40/(antireflection layer 42 and metal-containing electrode 20) in that order as viewed from the display side. Alternatively, antireflection layer 42 may be replaced by an antiglare layer 43 as shown in FIG. 8.

In the case of the aforesaid type (2), the optical filter for displays is not brought into contact with the surface of the screen of the display. As a result, it is unnecessary to form an anti-Newton ring layer or cause the transparent protective layer to function as an anti-Newton ring properties. Instead, it is necessary to impart antireflection properties or antiglare properties to both major surfaces of the optical filter for displays.

If transparent protective layer 40 functions as an antireflection layer or an antiglare layer, the optical filter for displays is composed as shown in FIG. 3 or 4. However, it depends on the position of an electrically conductive layer for grounding purposes to decide which major surface of the optical filter for displays is made to face the display. If transparent protective layer 40 does not function as an antireflection layer or an antiglare layer, anti-Newton ring layer 53 may be replaced by an antireflection layer 51 or an antiglare layer 52 in the optical filters for displays shown in FIGS. 7 and 8. However, it may be arbitrarily decided which major surface of the optical filter for displays is made to face the display.

Figure 9:
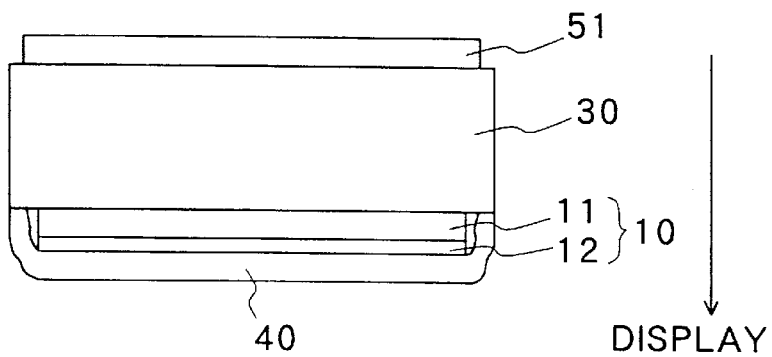
FIG. 9 is a sectional view of an optical filter for displays in accordance with a further embodiment of the present invention.
Figure 10:
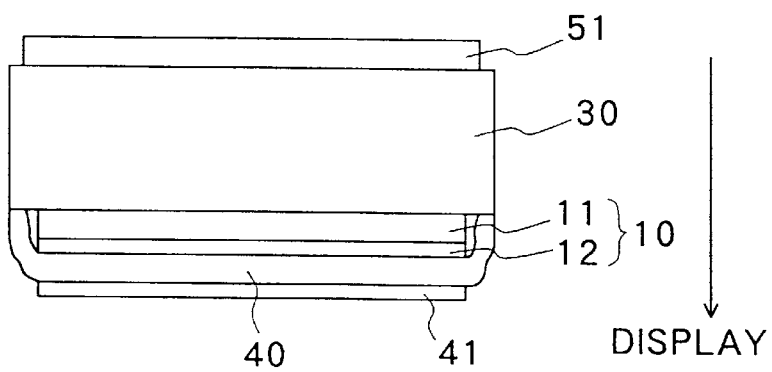
FIG. 10 is a sectional view of an optical filter for displays in accordance with a further embodiment of the present invention.

In the case of the aforesaid type (3), the optical filter for displays need not have an electrode. If the transparent protective layer functions as an anti-Newton ring layer, the optical filter for displays is composed as shown in FIG. 9 so that it consists of transparent protective layer 40/transparent laminate 10/transparent molded article 30/antireflection layer 51 in that order as viewed from the display side. Antireflection layer 51 may be replaced by an antiglare layer 52. If the transparent protective layer does not function as an anti-Newton ring layer, an anti-Newton ring layer 41 is bonded to transparent protective layer 40 as shown in FIG. 10. In either case, transparent protective layer 40 is formed so as to cover the whole surface of transparent laminate 10, including the side faces thereof.

In the case of the aforesaid type (4), if the transparent protective layer functions as an antireflection layer or an antiglare layer, the optical filter for displays is usually composed of (antireflection layer or antiglare layer)/transparent laminate/transparent molded article/(antireflection layer or antiglare layer) in that order.

When a near-infrared absorbing dye and/or a color tone dye are used in the optical filters for displays of the present invention, the dye(s) may be incorporated into any one or more of the above-described elements constituting the optical filters, or a transparent molded material containing the dye(s) may be sandwiched between any adjacent ones of the above-described elements. For example, when the transparent protective layer functions as an antireflection layer or an antiglare layer in the aforesaid type (2), the optical filter for displays is composed of (metal electrode and transparent protective layer)/transparent laminate/transparent molded article/dye-containing transparent molded material/(antireflection layer or antiglare layer) in that order as viewed from the display side. In this case, a film having antireflection properties or antiglare properties may be formed directly on the dye-containing transparent molded material, or a film having such a function may be bonded thereto.

Generally, when a transparent laminate or a polymeric film having any of the above-described functions is bonded to a transparent molded article comprising a transparent resin, or when the optical filter for displays so made is exposed to heat from the display or the environment during use, the optical filter for displays may be warped. Accordingly, it is essential to bond them so as not to cause warpage. When a polymeric film is bonded, it is important to bond it while balancing the forces (such as film tensions) exerted on the transparent molded article with respect to both surfaces, and not only one surface, thereof. When no bonding is made, it is important that the transparent molded article is not warped.

Especially when the optical filter for displays mounted on a display is warped toward the user, the visibility of the image is reduced. Moreover, when the optical filter for displays has an antiglare layer, a blur of the image may be caused.

Figure 11:
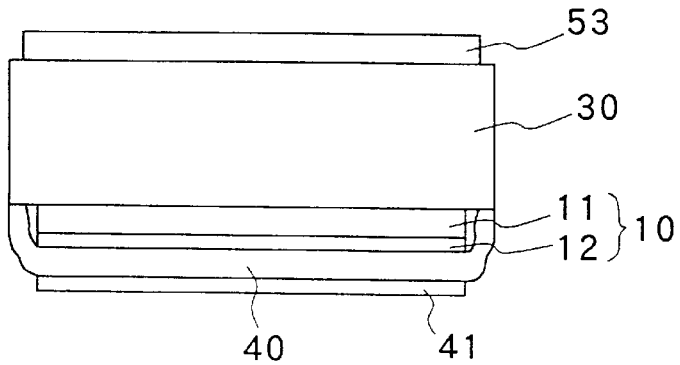
FIG. 11 is a sectional view of an optical filter for displays in accordance with a further embodiment of the present invention.

In the aforesaid type (3), the anti-Newton ring layer usually has antiglare properties. In this case, if the antiglare layer formed on the user-side major surface of the optical filter for displays has anti-Newton ring properties, this optical filter for displays may be used by bringing any desired side thereof into contact with the surface of the display screen. Thus, it is preferable that an anti-Newton ring layer is formed on either side of the optical filter for displays. In such a case, it is advisable to examine the direction of warpage of the optical filter for displays and mount it in such a direction that it comes into contact with the main body of the display without swelling toward the user. FIG. 11 illustrates an example of such an optical filter for displays. In this optical filter for displays, a first anti-Newton ring layer 41, a transparent protective layer 40, a transparent laminate 10, a transparent molded article 30 and a second anti-Newton ring layer 53 are laminated in that order.

The optical filters for displays of the present invention may be subjected to any desired frame printing in order that, when they are mounted on displays, the mounting assembly, the electrode and the like will be invisible to the user. No particular limitation is placed on the shape, surface, color and method employed for this frame printing. Moreover, they may further be worked, for example, to make holes for mounting them on displays. Furthermore, if they are provided with a polarizing film, a phase-difference film or the like to impart thereto the function of a circularly polarizing filter, they can further suppress reflected light from the display side and provide more excellent optical filters.

Since the optical filters for displays of the present invention have a high visible light transmittance, they do not detract from the definition of displays and have excellent electromagnetic shielding characteristics for blocking electromagnetic waves emitted from displays and considered to be harmful to health. Moreover, since they efficiently cut off near-infrared radiation, in the wavelength region of about 800 to 1,000 nm, emerging from plasma displays, they exert no adverse influence on wavelengths used in optical communication by transmission systems or the like, and can hence prevent the malfunction of infrared remote controllers for electronic equipment in the neighborhood thereof. Furthermore, they have good weather resistance and environmental resistance, as well as antireflection properties, antiglare properties and/or anti-Newton ring properties.

EXAMPLES

The present invention is further illustrated by the following examples. However, these examples are not to be construed to limit the scope of the invention. The film thicknesses given in the following examples and comparative examples are values obtained from the relationship between the film thickness and the film-forming time as determined previously under the same film-forming conditions, and are not values obtained by actually measuring the thicknesses of the films formed in these examples and comparative examples.

Example 1

According to a magnetron DC sputtering process, an ITO film (40 nm thick), a silver film (10 nm thick), an ITO film (80 nm thick), a silver film (15 nm thick), an ITO film (80 nm thick), a silver film (10 nm thick) and an ITO film (40 nm thick) were laminated, in that order, on one major surface of a biaxially stretched polyethylene terephthalate film (50 μm thick). Thus, a transparent laminate in accordance with the present invention, having three metal film layers and four high-refractive-index transparent film layers, was formed. The ITO films constituted the high-refractive-index transparent film layers, and the silver films constituted the metal film layers. The ITO films were formed by using an indium oxide/tin oxide sintered body [composed of $In_2O_3$ and $SnO_2$ in a ratio of 90:10 (wt. %)] as the target and an argon-oxygen gaseous mixture (with a total pressure of 266 mPa and a partial pressure of oxygen of 5 mPa) as the sputtering gas. The silver films were formed by using silver as the target and argon gas (with a total pressure of 266 mPa) as the sputtering gas.

Example 2

In the same manner as in Example 1, an ITO film (40 nm thick), a silver film (12 nm thick), an ITO film (80 nm thick), a silver film (12 nm thick), an ITO film (70 nm thick), a silver film (12 nm thick) and an ITO film (40 nm thick) were laminated, in that order, on one major surface of a biaxially stretched polyethylene terephthalate film (50 μm thick). Thus, a transparent laminate in accordance with the present invention was formed. This transparent laminate was different from the transparent laminate of Example 1 in the thicknesses of the ITO films and the silver films.

Example 3

In the same manner as in Example 1, an ITO film (40 nm thick), a silver film (9 nm thick), an ITO film (80 nm thick), a silver film (12 nm thick), an ITO film (80 nm thick), a silver film (9 nm thick) and an ITO film (40 nm thick) were laminated, in that order, on one major surface of a biaxially stretched polyethylene terephthalate film (50 μm thick). Thus, a transparent laminate in accordance with the present invention was formed. This transparent laminate was different from the transparent laminates of Examples 1 and 2 in the thicknesses of the ITO films and the silver films.

Example 4

In the same manner as in Example 1, an ITO film (40 nm thick), a silver film (11 nm thick), an ITO film (80 nm thick), a silver film (11 nm thick), an ITO film (80 nm thick), a silver film (13 nm thick), an ITO film (80 nm thick), a silver film (13 nm thick) and an ITO film (40 nm thick) were laminated, in that order, on one major surface of a biaxially stretched polyethylene terephthalate film (50 μm thick). Thus, a transparent laminate in accordance with the present invention, having four metal film layers and five high-refractive-index transparent film layers, was formed.

Example 5

According to a magnetron DC sputtering process, an indium oxide film (40 nm thick), a silver film (10 nm thick), an indium oxide film (70 nm thick), a silver film (10 nm thick), an indium oxide film (70 nm thick), a silver film (10 nm thick), an indium oxide film (60 nm thick), a silver film (6 nm thick), an indium oxide film (40 nm thick), a silver film (6 nm thick) and an indium oxide film (20 nm thick) were laminated, in that order, on one major surface of a biaxially stretched polyethylene terephthalate film (50 μm thick). Thus, a transparent laminate in accordance with the present invention, having five metal film layers and six high-refractive-index transparent film layers, was formed. The indium oxide films constituting the high-refractive-index transparent film layers were formed by using indium as the target and an argon-oxygen gaseous mixture (with a total pressure of 266 mPa and a partial pressure of oxygen of 80 mpa) as the sputtering gas. The silver films constituting the metal film layers were formed by using silver as the target and argon gas (with a total pressure of 266 mPa) as the sputtering gas.

Comparative Example 1

In the same manner as in Example 1, an ITO film (40 nm thick), a silver film (9 nm thick), an ITO film (70 nm thick), a silver film (9 nm thick) and an ITO film (40 nm thick) were laminated, in that order, on one major surface of a biaxially stretched polyethylene terephthalate film (50 μm thick). The transparent laminate so formed had two silver films and three ITO films on the polyethylene terephthalate film constituting a transparent substrate.

Example 6

According to a magnetron DC sputtering process, an indium oxide film (40 nm thick), a silver film (10 nm thick), an indium oxide film (70 nm thick), a silver film (10 rm thick), an indium oxide film (70 nm thick), a silver film (10 nm thick), an indium oxide film (60 nm thick), a silver-gold alloy film (6 nm thick), an indium oxide film (40 nm thick), a silver-gold alloy film (6 nm thick) and an indium oxide film (20 nm thick) were laminated, in that order, on one major surface of a biaxially stretched polyethylene terephthalate film (50 μm thick). Thus, a transparent laminate in accordance with the present invention, having five metal film layers and six high-refractive-index transparent film layers, was formed. The indium oxide films constituted the high-refractive-index transparent film layers, and the silver films and the silver-gold alloy films constituted the metal film layers. The indium oxide films were formed by using indium as the target and an argon-oxygen gaseous mixture (with a total pressure of 266 mPa and a partial pressure of oxygen of 80 mPa) as the sputtering gas. The silver films were formed by using silver as the target and argon gas (with a total pressure of 266 mPa) as the sputtering gas. The silver-gold alloy films were formed by using a silver-gold alloy [composed of silver and gold in a ratio of 85:15 (wt. %)] as the target and argon gas (with a total pressure of 266 mPa) as the sputtering gas.

Example 7

The major surface of the transparent laminate of Example 1 opposite to the transparent multilayer film was bonded to one major surface of a 2 mm thick PMMA plate [Acrylite (trade name); manufactured by Mitsubishi Rayon Co., Ltd.; 470 mm×350 mm) through the medium of a transparent tacky material. Moreover, as shown in FIG. 1, a silver paste (MSP-600F; manufactured by Mitsui Toatsu Chemicals, Inc.) was screen-printed on the transparent multilayer film-bearing surface (i.e., the electrically conductive surface) of the transparent laminate, and then dried to form a metal-containing electrode (with a resistivity of $5 \times 10^{-5}$ Ω·cm) having a thickness of 20 μm and a width of 10 mm. Thus, an optical filter for displays in accordance with the present invention was made.

Example 8

As shown in FIG. 1, a silver paste (manufactured by Mitsui Toatsu Chemicals, Inc.) was screen-printed on the transparent multilayer film-bearing surface (i.e., the electrically conductive surface) of the transparent laminate (472 mm×350 mm) of Example 5, and then dried to form a metal-containing electrode having a thickness of 20 μm and a width of 10 mm. Thus, an optical filter for displays in accordance with the present invention was made.

Example 9

Using an extruder, polyethylene terephthalate pellets 1203 (manufactured by Unitika, Ltd.) were mixed with 0.1% by weight of a dithiol complex of the following formula (3), melted at 260–280° C. and extruded to form a film having a thickness of 100 μm. Thereafter, this film was biaxially stretched to a thickness of 50 μm. On one major surface of this film, a 90 nm thick silicon oxide film was formed by electron beam vapor deposition to obtain an antireflection film. The visible light reflectance at the antireflection film-bearing surface was 1.4%. The visible light reflectance was measured by the method later discussed after the surface on which no antireflection film was formed was roughened with sand paper and painted in black. When the moisture permeability of this antireflection film was measured according to ASTM (American Society for Testing Materials)-E96, it was found to be 1.4 g/m²·day, indicating that this antireflection film had excellent gas barrier properties. The major surface of the antireflection film opposite to the silicon oxide film was bonded to the film-bearing surface of the transparent laminate of Example 1 through the medium of an acrylic tacky material. Thus, an optical filter for displays in accordance with the present invention was made. The acrylic tacky material used for this purpose had a refractive index of 1.64 and an extinction coefficient of 0 in the wavelength region of 500 to 600 nm. In this optical filter for displays, the aforesaid antireflection film containing a near-infrared absorbing dye and having gas barrier properties functions as a transparent protective layer having antireflection properties.

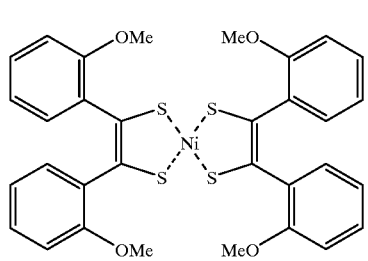

(3)

Example 10

An optical filter for displays in accordance with the present invention was made in the same manner as in Example 9, except that the transparent laminate of Example 2 was used in place of the transparent laminate of Example 1.

Example 11

An optical filter for displays in accordance with the present invention was made in the same manner as in Example 9, except that the transparent laminate of Example 3 was used in place of the transparent laminate of Example 1.

Comparative Example 2

An optical filter for displays was made in the same manner as in Example 9, except that the transparent laminate of Comparative Example 1 was used in place of the transparent laminate of Example 1.

Comparative Example 3

In the same manner as in Example 9, the film-bearing surface of the transparent laminate of Example 1 was bonded to one major surface of a polycarbonate film (100 μm thick) through the medium of an acrylic tacky material (having a refractive index of 1.64 and an extinction coefficient of 0 in the wavelength region of 500 to 600 nm). Thus, an optical filter for displays was made.

Example 12

In the same manner as in Example 5, an indium oxide film (40 nm thick), a silver film (10 nm thick), an indium oxide film (70 nm thick), a silver film (10 nm thick), an indium oxide film (70 nm thick), a silver film (10 nm thick) and an indium oxide film (40 nm thick) were laminated, in that order, on one major surface of a biaxially stretched polyethylene terephthalate film (50 μm thick). Thus, a transparent laminate in accordance with the present invention was formed.

Using an extruder, polyethylene terephthalate pellets 1203 (manufactured by Unitika, Ltd.) were mixed with 0.13% by weight of a dithiol complex of the following formula (4), melted at 260–280° C. and extruded to form a film having a thickness of 100 μm. Thereafter, this film was biaxially stretched to obtain a dye film having a thickness of 50 μm.

(4)

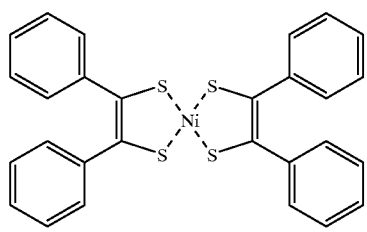

On the other hand, a solution of 3 g of a heat-curable varnish (SF-C-335; manufactured by Dainippon Ink & Chemicals, Inc.) in 100 g of a toluene/methyl ketone (10:1, in weight ratio) solvent mixture was applied to one major surface of a biaxially stretched polyethylene terephthalate film (100 μm thick), dried in air, and then cured at 150° C. for 20 seconds to form a 1 μm thick anti-Newton ring layer. Thus, there was obtained an anti-Newton ring film. When the haze of the anti-Newton ring layer was measured with a haze meter, it was found to be 2%, indicating that this anti-Newton ring film had antiglare properties.

The above dye film was bonded to one major surface of a 2 mm thick PMMA plate [Acrylite (trade name); manufactured by Mitsubishi Rayon Co., Ltd.], and the major surface of the transparent laminate opposite to the transparent multilayer film was bonded to the dye film overlying the PMMA plate. Thereafter, a transparent protective layer comprising an acrylic resin layer having a thickness of 10 μm was formed on the film-bearing surface of the transparent laminate by screen printing. Finally, using a transparent tacky material, anti-Newton ring films as described above were bonded to this transparent protective layer and the other major surface of the PMMA plate so that the anti-Newton ring layer will face the display. Thus, an optical filter for displays in accordance with the present invention was made.

Example 13

In the same manner as in Example 5, an indium oxide film (40 nm thick), a silver film (10 nm thick), an indium oxide film (80 nm thick), a silver film (15 nm thick), an indium oxide film (80 nm thick), a silver film (10 nm thick) and an indium oxide film (40 nm thick) were laminated, in that order, on one major surface of a biaxially stretched polyethylene terephthalate film (50 μm thick). Thus, a transparent laminate (470 mm×350 mm) in accordance with the present invention was formed.

This transparent laminate was bonded to a 2 mm thick PMMA plate (Acryfilter MR-NG; manufactured by Mitsubishi Rayon Co., Ltd.) having an antiglare layer on one surface and no antiglare layer on the other surface. In this case, the surface of the transparent laminate opposite to the transparent multilayer film was bonded to the other surface of the PMMA plate. When the haze of the antiglare layer on the PMMA plate was measured with a haze meter, it was found to be 2%. Moreover, a silver paste (manufactured by Mitsui Toatsu Chemicals, Inc.) was screen-printed on the film-bearing surface (i.e., the electrically conductive surface) of the transparent laminate as shown in FIG. 1, and then dried to form a metal-containing electrode having a thickness of 20 μm and a width of 10 mm.

On one major surface of a biaxially stretched polyethylene terephthalate film (100 μm thick), a 90 nm thick silicon oxide film was formed by electron beam vapor deposition to obtain an antireflection film. The visible light reflectance at the antireflection film-bearing surface was 1.4%. When the moisture permeability of this antireflection film was measured according to ASTM-E96, it was found to be 0.8 g/m$^2$·day, indicating that this antireflection film had gas barrier properties. To the portion of the film-bearing surface of the transparent laminate on which the metal-containing electrode was not formed, the major surface of the antireflection film opposite to the silicon oxide film was bonded through the medium of a transparent tacky material. Thus, an optical filter for displays in accordance with the present invention was made. In this optical filter for displays, the aforesaid antireflection film having gas barrier properties functions as a transparent protective layer having antireflection properties.

Example 14

The major surface of the transparent laminate of Example 1 opposite to the transparent multilayer film was bonded to one major surface of a 2 mm thick PMMA plate [Acrylite (trade name); manufactured by Mitsubishi Rayon Co., Ltd.; 470 mm×350 mm]. Moreover, a metal-containing electrode (with a resistivity of 5×10$^{-5}$ Ω·cm) was formed in the same manner as in Example 7.

On one major surface of a biaxially stretched polyethylene terephthalate film (50 μm thick), a 95 nm thick magnesium fluoride film was formed by electron beam vapor deposition to obtain a first antireflection film. The visible light reflectance at the antireflection film-bearing surface was 0.8%. When the moisture permeability of this first antireflection film was measured according to ASTM E96, it was found to be 1.9 g/m$^2$·day, indicating that this first antireflection film had gas barrier properties. To the part of the film-bearing surface of the transparent laminate on which the electrode was not formed, the major surface of the first antireflection film opposite to the magnesium fluoride film was bonded through the medium of an acrylic tacky material. The acrylic tacky material used for this purpose had a refractive index of 1.64 and an extinction coefficient of 0 in the wavelength region of 500 to 600 nm.

Moreover, using an extruder, polyethylene terephthalate pellets 1203 (manufactured by Unitika, Ltd.) were mixed with 0.014% by weight of a dye (PS-Red-G; manufactured by Mitsui Toatsu Chemicals, Inc.) having an absorption band in the wavelength region of 450 to 600 nm, melted at 260–280° C. and extruded to form a film having a thickness of 100 μm. Thereafter, this film was biaxially stretched to obtain a toning film having a thickness of 50 μm. On one major surface of this film, a 95 nm thick magnesium fluoride film was formed by electron beam vapor deposition to obtain a second antireflection film containing a toning dye. The visible light reflectance at the antireflection film-bearing surface was 0.8%. The major surface of the second antireflection film opposite to the magnesium fluoride film was bonded to the other major surface of the PMMA plate through the medium of a transparent tacky material. Thus, an optical filter for displays in accordance with the present invention was made.

In this optical filter for displays, the first antireflection film functions not only as an antireflection layer, but also as a transparent protective layer for protecting the transparent multilayer film.

Example 15

The transparent laminate of Example 1 was bonded to a 2 mm thick PMMA plate (Acryfilter MR-NG; manufactured by Mitsubishi Rayon Co., Ltd.; 470 mm×350 mm) having an antiglare layer on one surface and no antiglare layer on the other surface. In this case, the surface of the transparent laminate opposite to the transparent multilayer film was bonded to the other surface of the PMMA plate. When the haze of the antiglare layer on the PMMA plate was measured with a haze meter, it was found to be 2%. Moreover, a metal-containing electrode (with a resistivity of $5 \times 10^{-5}$ $\Omega \cdot cm$) was formed in the same manner as in Example 7.

Furthermore, a color tone film was formed in the same manner as in Example 14. A solution of 3 g of a heat-curable varnish (SF-C-335; manufactured by Dainippon Ink & Chemicals, Inc.) in 100 g of a toluene/methyl ketone (10:1, in weight ratio) solvent mixture was applied to one major surface of the toning film, dried in air, and then cured at 150° C. for 20 seconds to form a 1 $\mu$m thick anti-Newton ring layer. Thus, there was obtained an anti-Newton ring film containing a color tone dye. When the haze of the anti-Newton ring layer was measured with a haze meter, it was found to be 2%. When the moisture permeability of this anti-Newton ring film was measured according to ASTM-E96, it was found to be 1.2 g/m$^2$·day, indicating that this anti-Newton ring film had gas barrier properties. To the portion of the film-bearing surface of the transparent laminate on which the electrode was not formed and which would come into contact with the surface of the screen when mounted on the main body of a display, the major surface of the anti-Newton ring film opposite to the anti-Newton ring layer was bonded through the medium of an acrylic tacky material (having a refractive index of 1.64 and an extinction coefficient of 0 in the wavelength region of 500 to 600 nm). Thus, an optical filter for displays in accordance with the present invention was made. The anti-Newton ring film containing a color tone dye and having gas barrier properties functions not only as an anti-Newton ring layer, but also as a transparent protective layer.

Example 16

The major surface of the transparent laminate of Example 1 opposite to the transparent multilayer film was bonded to one major surface of a 2 mm thick PMMA plate [Acrylite; manufactured by Mitsubishi Rayon Co., Ltd.; 470 mm×350 mm]. On the other hand, a solution of 3 g of a heat-curable varnish (SF-C-335; manufactured by Dainippon Ink & Chemicals, Inc.) in 100 g of a toluene/methyl ketone (10:1, in weight ratio) solvent mixture was applied to one major surface of a biaxally stretched polyethylene terephthalate film (100 $\mu$m thick), dried in air, and then cured at 150° C. for 20 seconds to form a 1 $\mu$m thick anti-Newton ring layer. Thus, there was obtained a first anti-Newton ring film. When the haze of the anti-Newton ring layer in this first anti-Newton ring film was measured with a haze meter, it was found to be 2%. When the moisture permeability of this first anti-Newton ring film was measured according to ASTM-E96, it was found to be 1.2 g/m$^2$·day, indicating that this first anti-Newton ring film had both antiglare properties and gas barrier properties.

The major surface of the first anti-Newton ring film opposite to the anti-Newton ring layer was bonded to the film-bearing surface of the transparent laminate through the medium of an acrylic tacky material. In this case, the first anti-Newton ring film was bonded so as to cover the side faces of the transparent laminate, too, and thereby prevent the transparent multilayer film from being exposed to the environment. The acrylic tacky material had a refractive index of 1.64 and an extinction coefficient of 0 in the wavelength region of 500 to 600 nm.

Moreover, a second anti-Newton ring film containing a color tone dye was formed in the same manner as in Example 15. This second anti-Newton ring film containing a toning dye had antiglare properties. The major surface of the second anti-Newton ring film opposite to the anti-Newton ring layer was bonded to the other major surface of the PMMA plate through the medium of a transparent tacky material. Thus, an optical filter for displays in accordance with the present invention was made.

With respect to each of the transparent laminates formed in Examples 1–6, the transparent laminate formed in Comparative Example 1, the optical filters for displays made in Examples 7–13, and the optical filters for displays made in Comparative Examples 2–3, the sheet resistance, electromagnetic shielding ability, visible light transmittance, near-infrared cutting-off ability, visible light reflectance and environmental resistance were evaluated according to the following procedures.

1) Sheet Resistance

With respect to each of the Transparent laminates obtained in Examples 1–4 and 6 and in Comparative Example 1, the sheet resistance was measured according to the four-probe method (with a probe spacing of 1 mm). Moreover, with respect to each of the optical filters for displays of Examples 8 and 13, the sheet resistance of the transparent laminate used was measured in the same manner. The results of the measurements are shown in Table 1.

2) Electromagnetic Shielding Ability

With respect to each of optical filters for displays made in the following manner by using the transparent laminates obtained in Examples 1–4 and 6 and in Comparative Example 1, and each of the optical filters for displays obtained in Examples 7, 8 and 13, the electromagnetic shielding ability was measured.

With respect to each of the transparent laminates of Examples 1–4 and 6 and Comparative Example 1, the major surface opposite to the transparent multilayer film was bonded to one major surface of a 2 mm thick PMMA plate (Acrylite; manufactured by Mitsubishi Rayon Co., Ltd.; 470 mm×350 mm) through the medium of a transparent tacky material to make an optical filter for displays. Each of the optical filters for displays so made was mounted on the screen of a plasma display having a diagonal size of 21 inches, and a dipole antenna for the measurement of electric fields was placed at a position 3 m away from the center of the screen in a direction perpendicular to the screen. Then, using a spectrum analyzer (TP4172; manufactured by Advantest Corp.), the radiation field intensity in a frequency band of 20 to 90 MHz was measured. In this measurement, the transparent laminate was grounded by bringing its electrically conductive surface into contact with a grounding electrode on the main body of the display.

With respect to each of the optical filters for displays of Examples 7, 8 and 13, the optical filter was mounted on the plasma display and grounded by bringing its metal-containing electrode into contact with a grounding electrode on the main body of the display. Then, the radiation field intensity was measured in the same manner as described above.

The radiation field intensities measured in the above-described manner were evaluated at frequencies of 33, 62, 70 and 90 MHz. In domestic applications, a radiation field intensity of not greater than 40 dBμV/m is suitable for practical use, and lower radiation field intensities are better. The radiation field intensity from the plasma display on which no optical filter for displays was mounted was also measured. The results thus obtained are shown in Table 1.

3) Visible Light Transmittance ($T_{vis}$) and Near-infrared Transmittance

With respect to each of the transparent laminates of Examples 1–6 and Comparative Example 1, and with respect to each of the optical filters for displays of Examples 9–13 and Comparative Example 2, a small piece was cut out of the light transmitting portion of the object to be tested, and its parallel ray transmittance in the wavelength region of 300 to 1,000 nm was measured with a spectrophotometer (U-3400; manufactured by Hitachi Ltd.). From the transmittance thus obtained, the visible light transmittance ($T_{vis}$) was calculated according to JIS R-3106. The near-infrared transmittance was evaluated at wavelengths of 820 nm, 850 nm and 1,000 nm. The results thus obtained are shown in Table 2.

4) Critical Distance Test on an Infrared Remote Controller:

With respect to each of the transparent laminates of Examples 1–6 and Comparative Example 1, and with respect to each of the optical filters for displays of Examples 9–13 and Comparative Example 2, the degree of suppression of the interference with an infrared remote controller due to near-infrared radiation emerging from a plasma display was evaluated. With respect to each of the transparent laminates of Examples 1–6 and 9–11 and Comparative Examples 1–2, the major surface of the transparent laminate opposite to the transparent multilayer film was bonded to one major surface of a 2 mm thick PMMA plate (Acrylite; manufactured by Mitsubishi Rayon Co., Ltd.; 470 mm×350 mm) through the medium of a transparent tacky material to make an optical filter for displays. This optical filter for displays was used for evaluation purposes.

The optical filter for displays to be tested was mounted on the screen of a plasma display having a diagonal size of 21 inches. An electronic device using an infrared remote controller was placed 0.2–5 m away from the plasma display and examined for the malfunction thereof due to near-infrared radiation emerging from the plasma display. When a malfunction was observed, the critical distance for malfunction was measured. Shorter critical distances indicate less malfunction. From a practical point of view, the critical distance for malfunction should be not greater than 3.0 m, preferably not greater than 2.5 m, and more preferably not greater than 1.5 m.

The critical distance for malfunction of the plasma display having no optical filter for displays mounted thereon was also measured. The results thus obtained are shown in Table 2.

5) Visible Light Reflectance ($R_{vis}$)

With respect to each of the transparent laminates of Examples 1–4 and Comparative Example 1, the visible light reflectance ($R_{vis}$) was measured before and after an acrylic tacky material was bonded to the film-bearing surface. The acrylic tacky material used for this purpose had a refractive index of 1.64 and an extinction coefficient of 0 in the wavelength region of 500 to 600 nm.

A small piece was cut out of the object to be tested. Using an integrating sphere (with an angle of incidence of 6 φ), the total light reflectance at both surfaces of the test piece in the wavelength region of 300 to 800 nm was measured with a spectrophotometer (U-3400; manufactured by Hitachi Ltd.). From the reflectance thus obtained, the visible light reflectance ($R_{vis}$) was calculated according to JIS R-3106. The results thus obtained are shown in Table 3.

Moreover, with respect to each of the transparent laminate of Example 6 and the optical filters for displays of Examples 9, 10, 11 and 13 and Comparative Examples 2 and 3, the visible light reflectance ($R_{vis}$) was measured in the same manner as described above, except that an acrylic tacky material was not bonded thereto. The results thus obtained are shown in Table 4.

6) Environmental Resistance (high-temperature/high-humidity test)

With respect to each of the transparent laminates of Examples 1 and 6, and with respect to each of the optical filters for displays of Examples 9, 10, 11 and 13–16 and Comparative Examples 2 and 3, the object to be tested was allowed to stand for 48 hours in an atmosphere having a temperature of 60° C. and a humidity of 95%, and then examined for whitening. When no whitening (white spots or general whitening) was observed after standing under such environmental conditions for 48 hours, the object was regarded as suitable for practical use. The results thus obtained are shown in Table 4. For the optical filters for displays, the moisture permeability of the polymeric film bonded to the film-bearing surface of the transparent laminate is also shown in Table 4.

The above-described results are shown in Tables 1 to 4 below.

TABLE 1

| | Sheet resistance | Radiation field intensity (dBmV/m) | | | |
|---|---|---|---|---|---|
| | (Ω/sq.) | 33 MHz | 62 MHz | 70 MHz | 90 MHz |
| None Transparent laminate | — | 48 | 44 | 44 | 44 |
| Example 1 | 2.1 | 37 | 31 | 34 | 33 |
| Example 2 | 1.9 | 35 | 29 | 30 | 29 |
| Example 3 | 2.5 | 39 | 35 | 35 | 33 |
| Example 4 | 1.5 | 31 | 28 | 25 | 26 |
| Example 6 | 2.8 | 39 | 37 | 37 | 36 |
| Comparative Example 1 | 4.9 | 43 | 41 | 37 | 34 |
| Optical filter | | | | | |
| Example 7 | Same as in Example 1 | 34 | 30 | 33 | 31 |
| Example 8 | 2.7 | 33 | 28 | 32 | 25 |
| Example 13 | 2.4 | 36 | 31 | 35 | 32 |

TABLE 2

| Laminate used | Visible light transmittance, $T_{vis}$ (%) | Near-infrared transmittance (%) | | | Critical distance for malfunction (m) |
|---|---|---|---|---|---|
| | | 820 nm | 850 nm | 1,000 nm | |
| None | — | — | — | — | 5 or greater |
| Transparent Laminate | | | | | |
| Example 1 | 70 | 9.6 | 6.5 | 2.6 | 1.5 |
| Example 2 | 68 | 7.9 | 3.8 | 2.2 | 0.5 |
| Example 3 | 71 | 12 | 9.3 | 3.1 | 3.0 |
| Example 4 | 58 | 6.1 | 1.9 | 0.7 | 0.3 |
| Example 5 | 59 | 9.8 | 4.5 | 0.5 | 0.2 |
| Example 6 | 53 | 8.2 | 3.3 | 0.5 | 0.3 |
| Comparative Example 1 | 78 | 21 | 18 | 12 | 5 or greater |
| Optical filter | | | | | |
| Example 9 Example 1 | 66 | 8.9 | 3.5 | 2.5 | 0.5 |
| Example 10 Example 2 | 65 | 7.1 | 2.1 | 2.1 | 0.3 |
| Example 11 Example 3 | 67 | 9.8 | 4.9 | 3.0 | 1.0 |
| Comparative Example 2 Comparative Example 1 | 73 | 19 | 9.5 | 12 | 4.0 |
| Example 12 | 61 | 9.2 | 2.9 | 4.0 | 0.5 |
| Example 13 | 69 | 9.6 | 3.4 | 2.5 | 0.5 |

TABLE 3

| Transparent laminate | Visible light reflectance [$R_{vis}$ (%)] before and after bonding of tacky material | |
|---|---|---|
| | Before bonding | After bonding |
| Example 1 | 7.6 | 6.3 |
| Example 3 | 7.1 | 6.1 |
| Example 2 | 6.4 | 9.2 |
| Example 4 | 6.7 | 9.6 |
| Comparative Example 1 | 8.2 | 10.3 |

TABLE 4

| | Transparent Laminate used | Visible light reflectance, $R_{vis}$ (%) | Moisture permeability of film bonded to film-bearing surface (g/m² · day) | High-temperature/ high-humidity test |
|---|---|---|---|---|
| Example 1 | | 7.6 | — | General whitening |
| Example 6 | | 6.9 | — | No change |
| Example 9 | Example 1 | 3.7 | 1.4 | No change |
| Example 10 | Example 2 | 5.6 | 1.4 | No change |
| Example 11 | Example 3 | 3.6 | 1.4 | No change |
| Example 13 | | 6.2 | 0.8 | No change |
| Comparative Example 2 | Comparative Example 1 | 4.2 | 1.4 | No change |
| Comparative Example 3 | Example 1 | 6.7 | 12 | White spots |

As is evident from Table 1, a practically sufficient electromagnetic shielding effect is clearly recognized when the sheet resistance is not greater than 3 Ω/sq. The electromagnetic shielding effect becomes greater as sheet resistance is reduced. When the transparent laminate of Comparative Example 1 having a sheet resistance of 4.9 Ω/sq. is used, the electromagnetic shielding effect does not reach a practical level in some frequency bands. Moreover, when Example 1 is compared with Example 7, it can be seen that the electromagnetic shielding effect is increased by forming a metal-containing electrode on the transparent laminate and bringing this electrode into contact with a grounding electrode on the main body of the display.

As is evident from Table 2, the optical filters for displays using the transparent laminates of Examples 1, 2, 4, 5 and 6 and the optical filters for displays of Examples 12 and 13, in which the light transmittance in a wavelength region longer than 820 nm is less than 10%, exhibit a short critical distance for malfunction and hence have practically sufficient near-infrared blocking ability. The transparent laminate of Examples 3 does not meet the requirement that the light transmittance in a wavelength region longer than 820 nm is less than 10%, and the critical distance for malfunction of the optical filter for displays using this transparent laminate is greater, but within a practically acceptable limit. However, the optical filter for displays using the transparent laminate of Comparative Example 1 is not suitable for practical use because of its high near-infrared transmittance and very great critical distance for malfunction, though it has a high visible light transmittance.

The optical filters for displays of Examples 9 and 10 using a near-infrared absorbing dye in combination with the transparent laminates of Examples 1 and 2, respectively, have become more suitable for practical use in that the near-infrared blocking ability is improved. However, the visible light transmittance is reduced as compared with Examples 1 and 2. The optical filter for displays of Example 11 using a near-infrared absorbing dye in combination with the transparent laminate of Example 3 has become suitable for practical use in that the light transmittance in a wavelength region longer than 820 nm is reduced to less than 10% and the near-infrared blocking ability is improved. However, the visible light transmittance is reduced as compared with Examples 3.

The optical filter for displays of Comparative Example 2 using a near-infrared absorbing dye in combination with the transparent laminate of Comparative Example 1 is not suitable for practical use in that the light transmittance in a wavelength region longer than 820 nm exceeds 10% in spite of the combined use of the near-infrared absorbing dye and, therefore, the critical distance for malfunction is great. If one or more additional near-infrared absorbing dyes are added to the transparent laminate of Comparative Example 1 so as to give a light transmittance of less than 10% in a wavelength region longer than 820 nm, the visible light transmittance will be markedly reduced.

As is evident from Table 3, in the transparent laminates of Examples 1 and 3 which comprise a total of seven layers including ITO films and silver films laminated alternately on a transparent substrate and in which the second silver film as number from the transparent substrate side is thicker than the first and third silver films, the visible light reflectance is reduced even after a transparent tacky material layer is formed on the film-bearing surface, and they are hence suitable for use in optical filters for displays. In the transparent laminates of Examples 2 and 4 and Comparative Example 1, the visible light reflectance is increased by more than 2% after a transparent tacky material layer is formed thereon.

As is evident from Table 4, the optical filters for displays of Examples 9–11 and Comparative Example 2 in which an antireflection layer is used in combination show a significant reduction in visible light reflectance, as compared with those having no antireflection layer formed thereon. In particular, The optical filters for displays of Examples 9 and 11 using the transparent laminates of Examples 1 and 3, respectively, which comprise a total of seven layers including ITO films and silver films laminated alternately on a transparent substrate and in which the second silver film as number from the transparent substrate side is thicker than the first and third silver films, are preferred because of their markedly low visible light reflectances.

The environmental resistance was lowest in the transparent laminate of Example 1 in which no film is bonded to the film-bearing surface. The optical filter for displays of Comparative Example 3 in which the film bonded to the film-bearing surface has a moisture permeability of not less than 10 $g/m^2 \cdot day$ is not suitable for practical use in that white spots were produced.

The transparent laminate of Example 6 using silver-containing alloy films was more excellent in environmental resistance than the transparent laminate of Example 1.

Moreover, the optical filters for displays of Examples 14 and 15 were subjected to a high-temperature/high-humidity test, though the results are not shown in Table 4. In both of them, no whitening was observed in either the light-transmitting portion or the electrode-bearing portion. When the optical filter for displays of Example 16 was subjected to a high-temperature/high-humidity test, no whitening was observed in the light-transmitting portion or in the vicinity of the side faces. The optical filter for displays of Example 14 had a visible light transmittance ($T_{vis}$) of 69% and a visible light reflectance ($R_{vis}$) of 2.5%. The optical filter for displays of Example 15 had a visible light transmittance ($T_{vis}$) of 67% and, moreover, excellent antiglare properties. Similarly, the optical filter for displays of Example 16 had a visible light transmittance ($T_{vis}$) of 67% and, moreover, excellent antiglare properties.

In the transparent laminate of Example 1, the color of transmitted light was green (when calculated from the parallel ray transmittance, $a^*=-8$ and $b^*=2$ in the $L^*a^*b^*$ calorimetric system). However, in the optical filters for displays of Examples 14–16 in which a color tone dye was used in combination with the transparent laminate of Example 1, the color of transmitted light was gray (when calculated from the parallel ray transmittance, $a^*=-3$ and $b^*=1$ in the $L^*a^*b^*$ calorimetric system) and hence preferred because an excellent contrast was obtained when these optical filters for displays were placed on plasma displays. Moreover, the optical filters for displays of Example 14 and 15 had an electromagnetic shielding effect equal to that of the optical filters for displays of Example 7, and could preferably be used. Furthermore, they could be mounted without damaging the film-bearing surface.

When each of the optical filters for displays of Examples 12–16 was mounted on the screen of a plasma display, no malfunction of electronic equipment was observed owing to infrared remote controllers placed in the neighborhood of the plasma display. Moreover, the picture was sharply defined and had good visibility because of little reflection of external light.

Each of the optical filters for displays of Examples 12, 15 and 16 was superposed on a plane glass plate with the anti-Newton ring layer-bearing surface facing downward, and 500 g weights were placed at the four corners of the optical filter for displays. The optical filter for displays was irradiated with light from a three-wavelength-range emitting fluorescent lamp [Lupica (trade name); manufactured by Mitsubishi Electric Corp.; power consumption 20 W] placed just above the center thereof, and observed for the production of Newton rings from a direction forming an angle of 10–80 $\phi$ with the plane of the optical filter. In all cases, no Newton ring was produced. The optical filters for displays of Examples 12 and 16 had an anti-Newton ring layer on either major surface thereof, and no Newton ring was produced regardless of the choice of the major surface coming into contact with the glass plate.

When each of the optical filters for displays of Examples 12, 15 and 16 was mounted in contact with the screen of a plasma display, no Newton ring was produced. In particular, the optical filters for displays of Example 12 and 16 produced no Newton ring, regardless of the choice of the major surface facing the display. Moreover, they provided good visibility of the picture because of little reflection of external light.

As described above, the present invention provides transparent laminates which can block intense electromagnetic waves emerging from plasma displays by grounding them, have high transparency in the visible light region without detracting from the definition of the display, and can cut off near-infrared radiation in a wavelength region longer than 820 nm which may cause the malfunction of neighboring electronic equipment. By using these transparent laminates, the present invention also provides optical filters for displays which have excellent near-infrared blocking ability in a wavelength region longer than 820 nm, excellent electromagnetic shielding ability, good weather resistance and environmental resistance, and excellent antiglare properties, antireflection properties and/or anti-Newton ring properties. Moreover, by the combined use of dyes, the present invention further provides optical filters for displays which have more excellent near-infrared blocking ability and/or a preferable color of transmitted light.

What is claimed is:

1. An optical filter for plasma displays which blocks electromagnetic waves and near-infrared radiation emerging from the plasma display, said optical filter comprising:

a transparent laminate formed by laminating high-refractive-index transparent film layers and metal film layers consisting of silver or a silver-containing alloy on one surface of a transparent substrate in such a way that a repeating unit comprising a combination of one high-refractive-index transparent film layer and one metal film layer in this order is repeatedly laminated from three times to six times, and further laminating at least a high-refractive-index transparent film layer thereon;

wherein a sheet resistance of an electrically conductive surface of a topmost surface of the transparent laminate is not greater than 3 ohm/sq., and said transparent laminate has a visible light transmittance of not less than 50%, and a light transmittance of not great than 20% at any wavelength between 820 nm and 1000 nm;

a metal containing electrode electrically connected to the electrically conductive surface; and the transparent laminate contains a dye which is near-infrared absorbing dye and/or a toning dye which has an absorption band in the visible region.

2. An optical filter for plasma displays as claimed in claim 1, wherein said optical filter has a transparent protective layer which is directly formed on the electrically conductive surface or formed on the electrically conductive surface via one of a transparent tacky material layer and a transparent adhesive layer, said optical filter has optical design of the transparent laminate such that the resulting increase in visible light reflectance of the electrically conductive surface is not greater than 2% when the transparent protective layer is directly formed on the electrically conductive surface or formed on the electrically conductive surface via one of a transparent tacky material layer and a transparent adhesive layer.

3. An optical filter for plasma displays as claimed in claim 2, wherein said optical filter has a light transmittance of not greater than 10% at any wavelength between 820 nm and 1000 nm.

4. An optical filter for plasma displays as claimed in claim 3, wherein the transparent substrate comprises a transparent polymeric film.

5. An optical filter for plasma displays as claimed in claim 4, wherein the repeating unit is repeatedly laminated three times and the second metal film layer consisting of silver or a silver-containing alloy as numbered from said transparent substrate side is thicker than the first and third metal film layers.

6. An optical filter for plasma displays as claimed in claim 5, wherein the transparent protective layer has a surface roughness of 0.1 to 10 $\mu$m and the surface of said transparent protective layer has antiglare properties.

7. An optical filter for plasma displays as claimed in claim 6, wherein the surface of said transparent protective layer has anti-Newton ring properties.

8. An optical filter for plasma displays as claimed in claim 4, wherein said high-refractive-index transparent film layers consist essentially of indium oxide.

9. An optical filter for plasma displays as claimed in claim 4, wherein said transparent protective layer has a moisture permeability of not greater than 10 g/m$^2$day.

10. An optical filter for plasma displays as claimed in claim 4, wherein the surface of said transparent protective layer has a visible light reflectance of not greater than 2%.

11. An optical filter for plasma displays as claimed in claim 4, wherein the transparent protective layer has a surface roughness of 0.1 to 10 $\mu$m and the surface of said transparent protective layer has antiglare properties.

12. An optical filter for plasma displays as claimed in claim 11, wherein the surface of said transparent protective layer has anti-Newton ring properties.

13. An optical filter for plasma displays as claimed in claim 4, wherein a metal-containing electrode is formed on said electrically conductive surface of said transparent laminate, said metal-containing electrode being formed on a peripheral region of said electrically conductive surface.

14. An optical filter for plasma displays as claimed in claim 4 further comprising a transparent molded plate composed of a material selected from the group consisting of glass, polymethyl methacrylate, polycarbonate and transparent ABS resin, wherein one major surface of said transparent molded plate is bonded, as a support for said transparent laminate, to one major surface of said transparent laminate via one of a transparent tacky material layer and a transparent adhesive layer.

15. An optical filter for plasma displays as claimed in claim 14 wherein an antireflection layer is provided on the other major surface of said transparent molded plate.

16. An optical filter for plasma displays as claimed in claim 14 wherein an antiglare layer is provided on the other major surface of said transparent molded plate.

17. An optical filter for plasma displays as claimed in claim 16 wherein said antiglare layer has anti-Newton ring properties.

18. An optical filter for plasma displays as claimed in claim 3, wherein the repeating unit is repeatedly laminated three times and the second metal film layer consisting of silver or a silver-containing alloy as numbered from said transparent substrate side is thicker than the first and third metal film layers.

19. An optical filter for plasma displays as claimed in claim 3, wherein said high-refractive-index transparent film layers consist essentially of indium oxide.

20. An optical filter for plasma displays as claimed in claim 3, wherein said transparent protective layer has a moisture permeability of not greater than 10 g/m$^2$day.

21. An optical filter for plasma displays as claimed in claim 3, wherein the surface of said transparent protective layer has a visible light reflectance of not greater than 2%.

22. An optical filter for plasma displays as claimed in claim 3, wherein a metal-containing electrode is formed on said electrically conductive surface of said transparent laminate, said metal-containing electrode being formed on a peripheral region of said electrically conductive surface.

23. An optical filter for plasma displays as claimed in claim 3 wherein an antireflection layer is provided on a major surface of said transparent laminate opposite to said transparent protective layer across the transparent substrate.

24. An optical filter for plasma displays as claimed in claim 3 wherein an antiglare layer is provided on the other major surface of said transparent laminate, said other major surface being opposite to said transparent protective layer across the transparent substrate.

25. An optical filter for plasma displays as claimed in claim 24 wherein said antiglare layer has anti-Newton ring properties.

* * * * *